United States Patent [19]
Kasahara et al.

[11] Patent Number: 5,583,900
[45] Date of Patent: Dec. 10, 1996

[54] STRUCTURAL MEMBER HAVING SUPERIOR RESISTANCE TO NEUTRON IRRADIATION EMBRITTLEMENT, AUSTENITIC STEEL FOR USE IN SAME, AND USE THEREOF

[75] Inventors: Shigeki Kasahara, Hitachi; Kiyotomo Nakata, Katsuta; Shizuka Shimanuki, Hitachi; Shinzo Ikeda, Ibaraki-ken; Masayoshi Kanno, Kitaibaraki, all of Japan

[73] Assignee: Hitachi, Ltd., Tokyo, Japan

[21] Appl. No.: 214,297

[22] Filed: Mar. 17, 1994

[30] Foreign Application Priority Data

Mar. 18, 1993 [JP] Japan .................. 5-058330

[51] Int. Cl.$^6$ .................. G21C 11/00; C22C 38/00
[52] U.S. Cl. .................. 376/288; 376/305; 376/900; 420/35; 420/44
[58] Field of Search .................. 376/277, 287, 376/288, 305, 463, 900; 420/35, 44, 584.1; 148/327

[56] References Cited

U.S. PATENT DOCUMENTS

| | | | |
|---|---|---|---|
| 4,384,891 | 5/1983 | Barnabe | 420/584.1 |
| 5,116,569 | 5/1992 | Kasahara et al. | 376/900 |
| 5,147,602 | 9/1992 | Anderson et al. | 420/35 |
| 5,151,248 | 9/1992 | Ebara et al. | 420/35 |
| 5,316,597 | 5/1994 | Kato et al. | 376/900 |

FOREIGN PATENT DOCUMENTS

| | | |
|---|---|---|
| 458606 | 11/1991 | European Pat. Off. . |
| 62-107047 | 5/1987 | Japan . |
| 62-238355 | 10/1987 | Japan . |
| 62-238353 | 10/1987 | Japan . |
| 1-18143 | 4/1989 | Japan . |
| 3-72054 | 3/1991 | Japan . |

OTHER PUBLICATIONS

"Platinum Metals Review", vol. 34, No. 2, (Apr. 1990), pp. 85–97, McGill.
"Platinum Metals Review", vol. 21, No. 1, (Jan. 1977), pp. 51–55, Streicher.

*Primary Examiner*—Daniel D. Wasil
*Attorney, Agent, or Firm*—Antonelli, Terry, Stout & Kraus

[57] ABSTRACT

This invention provides austenitic steel having a superior resistance to neutron irradiation, a nuclear reactor and a nuclear fission reactor using such steel.

In the present invention, austenitic steel containing at least one of Pd and Pt is used for a member which undergoes neutron irradiation in high-temperature water. More specifically, the steel consists essentially of not more than 0.02% C, not more than 1% Si, 0.5–15% Mn, 9–26% Cr, 8–20% Ni, 0.5–3% Mo, at least one kind of 0.1–16% selected from the group consisting of Pd and Pt, and not less than 50% Fe, and may further contain not more than 1.0% of at least one kind selected from the group consisting of Nb, Ti, Zr, Hf and V, and this is used for structural members in a core of a nuclear reactor and a nuclear fission reactor.

23 Claims, 12 Drawing Sheets

F I G. 15
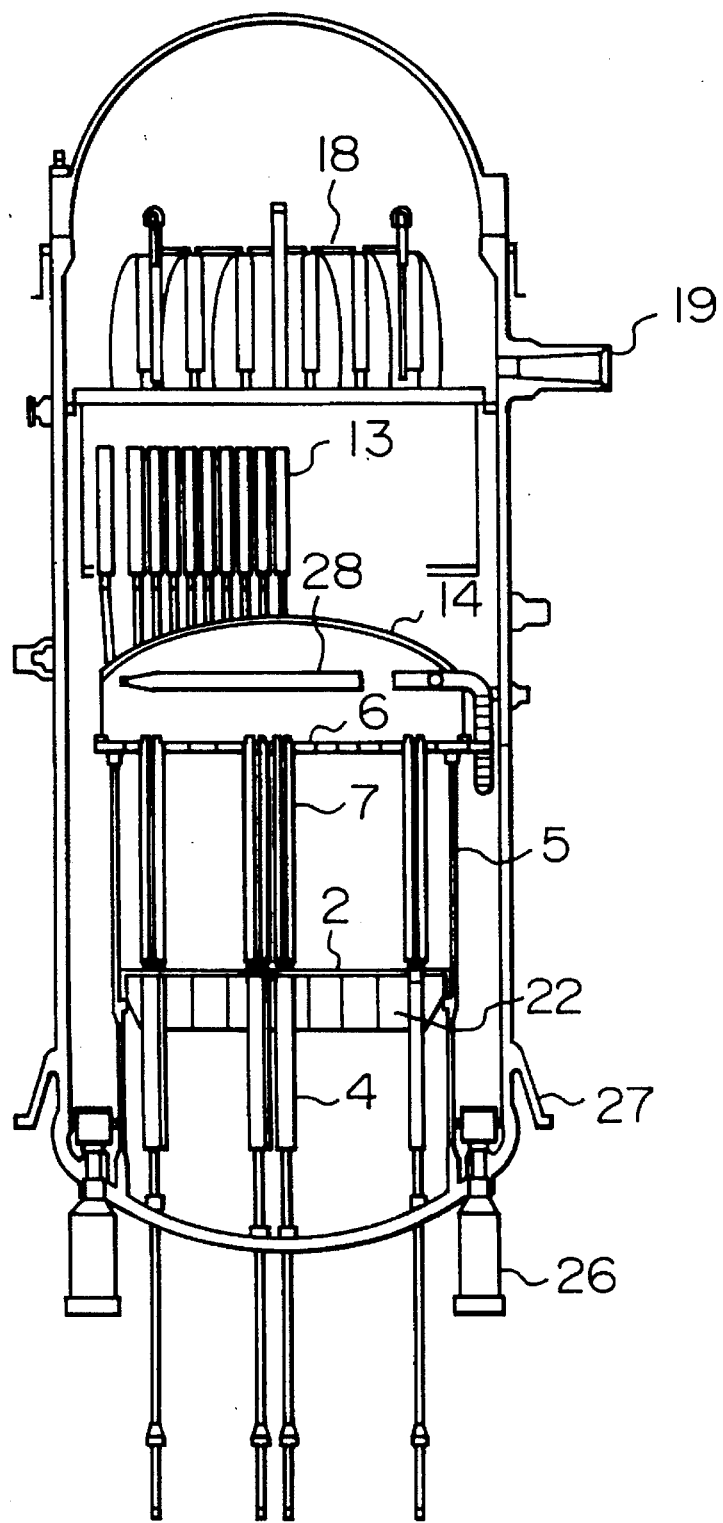

STRUCTURAL MEMBER HAVING SUPERIOR RESISTANCE TO NEUTRON IRRADIATION EMBRITTLEMENT, AUSTENITIC STEEL FOR USE IN SAME, AND USE THEREOF

FIELD OF THE INVENTION

This invention relates to a member which is made of novel austenitic steel, and is in contact with high-temperature, high-pressure water under irradiation, and more particularly to austenitic steel having a superior resistance to intergranular hydrogen embrittlement, and also to a novel nuclear reactor and a novel nuclear fission reactor which use the same.

BACKGROUND OF THE INVENTION

At present, stainless steel JIS 304 or 316 has been used for structural members for a core structure and equipment of a light water reactor, and measures have been taken for such steel to enhance a corrosion resistance and a resistance to intergranular fracture susceptibility in an environment in which such steel is used. For example, as a method of relieving or preventing intergranular cracking from occurring due to intergranular corrosion and intergranular stress corrosion cracking (hereinafter referred collectively to as "intergranular corrosion") in steel used in high-temperature water, there is known a method, as disclosed in Japanese Patent Examined Publication No. 1-18143 and Japanese Patent Unexamined Publication Nos. 62-238355 and 62-238353, in which the amount of carbon contained in stainless steel is reduced, and a carbide stabilizing element such as Nb and Ti is added to suppress or prevent a Cr exhaustion phenomenon from occurring in the vicinity of a grain boundary. Japanese Patent Unexamined Publication No. 62-107047 discloses a method of preventing intergranular corrosion from occurring due to neutron irradiation, in which Si and P are reduced, and an element for producing stable carbide, such as Mo, Nb and Ti, is added to suppress the formation of carbide of Cr. Further, Japanese Patent Unexamined Publication No. 3-72054 discloses a method in which the arrangement of components is adjusted in such a manner that a volume size factor of Cr relative to an average atomic volume of a matrix phase in stainless steel is 0.900–1.030, thereby suppressing the mechanism of producing an irradiation-induced intergranular Cr-shortage layer. These techniques have been developed for the purpose of suppressing the occurrence of the Cr-shortage layer in the vicinity of the grain boundary to enhance a resistance to intergranular corrosion in high-temperature, high-pressure water, and have been intended particularly for stainless steel used for parts of a core structure of a nuclear reactor and a first wall of a nuclear fission reactor.

However, it has been found that when such stainless steel is provided in a core of a nuclear reactor, hydrogen, occurring or infiltrating in the stainless steel because of a high-temperature, high-pressure water environment and a neutron irradiation environment, is accumulated in the grain boundary to induce grain boundary embrittlement to increase intergranular fracture susceptibility. Hydrogen occurs or infiltrates in the stainless steel, used in a nuclear reactor, through the following process.

(1) (n, p) nuclear reaction of impurities in steel due to neutrons.

(2) Decomposition (radiolysis) of reactor water due to γ-ray.

(3) Corrosion reaction due to high-temperature, high-pressure water.

When the hydrogen in the stainless steel is accumulated in the grain boundary, so-called hydrogen-induced grain boundary embrittlement occurs to increase intergranular fracture susceptibility of the member, thereby adversely affecting the resistance to neutron irradiation embrittlement.

In the above prior art techniques, no consideration has been given to the increase in the intergranular fracture susceptibility due to the hydrogen grain boundary embrittlement in the stainless steel, and they have a problem on resistance to intergranular cracking in high-temperature, high-pressure water under neutron irradiation.

SUMMARY OF THE INVENTION

It is an object of this invention to provide austenitic steel having a superior resistance to neutron irradiation embrittlement.

Another object of this invention is to provide austenitic stainless steel for use under neutron irradiation which steel is so adjusted in chemical composition as to suppress the amount of hydrogen occurring by (n, p) nuclear reaction of neutrons.

A further object of this invention is to provide stainless steel which is so adjusted in chemical composition as to trap hydrogen, produced or infiltrated in the steel in an environment of a nuclear reactor, in grains, thereby suppressing the accumulation thereof in grain boundaries.

A further object of this invention is to provide a reactor core of a light water reactor, a heavy water reactor or a nuclear fission reactor, as well as a peripheral equipment thereof, wherein a structural member or equipment is made of austenitic iron-based alloy which exhibits a superior resistance to hydrogen embrittlement intergranular fracture susceptibility in an environment in which the above structural member and the above equipment undergoes high-velocity (not less than $10^{23} n/m^2$) neutron irradiation damage or equivalent corpuscle irradiation damage, and are in contact with water.

The present invention is characterized in that at least a surface of a member used in contact with water under neutron irradiation is made of austenitic steel containing at least one of Pd and Pt, and more specifically is made of austenitic steel consisting essentially, by weight, of not more than 0.02% C, not more than 1% Si, not more than 0.02% P, not more than 0.02% N, 0.5–16% Mn, 9–26% Cr, 8–20% Ni, 0.5–3% Mo, at least one kind selected from the group consisting of 0.1–16% Pt and 0.1–16% Pd, and not less than 50% of the balance Fe, and the invention provides austenitic steel having a superior resistance to intergranular hydrogen embrittlement occurring due to neutron irradiation, and that 0.1–16% of the element liable to form a hydride is solid-solutioned in the steel.

The present invention provides austenitic steel having a superior resistance to neutron irradiation embrittlement, characterized in that the steel consists essentially, by weight, of not more than 0.02% C, not more than 1% Si, not more than 0.02% P, not more than 0.02% N, 0.5–16%, Mn, 9–26% Cr, 8–20% Ni, 0.5–3% Mo, at least one kind selected from the group consisting of 0.1–16% Pt and 0.1–16% Pd, and not less than 50% of the balance Fe; and that a volume size factor of Cr of the austenitic steel relative to an average atomic volume of a matrix phase thereof is 0.900–1.030.

Further, the present invention is characterized by austenitic steel which consists essentially, by weight, of not more than 0.02% C, not more than 1% Si, not more than 0.02% P, not more than 0.02% N, 0.5–15% Mn, 9–26% Cr, 8–20% Ni, 0.5–3% Mo, at least one kind selected from the group consisting of 0.1–16% Pt and 0.1–16% Pd, and not less than 50% of the balance Fe.

The present invention is characterized in that at least one kind of not more than 1% in total selected from the group consisting of Nb, Ti, Hf, V, Ta and Zr is contained in the above-mentioned steel.

Further, the present invention is characterized by austenitic steel which has a wholly austenitic structure, and an area ratio of intergranular stress corrosion cracking, obtained when the steel is irradiated with neutrons of $5 \times 10^{26}$ n/m$^2$ at 300° C., and thereafter hydrogen is forcibly infiltrated in the steel in high-pressure water at 300° for 24 hours, and then the steel is subjected to a tensile test at a strain rate of $3 \times 10^{-7}$/sec. in a room-temperature atmosphere or in high-temperature, high-pressure water, is not more than 30%, and preferably not more than 10%, and not more than 16% of at least one of the above-mentioned Pd and Pt is added.

The present invention provides a structural member having a superior resistance to neutron irradiation embrittlement, which member is made of austenitic steel and is used in contact with water under neutron irradiation, and hydrogen absorbed in the member is trapped in grains.

The present invention provides a nuclear reactor, comprising structural members provided within a reactor pressure vessel which members are a neutron source pipe, a reactor core support plate, a neutron instrumentation pipe, a control rod insertion pipe, a shroud, an upper lattice plate, a fuel assembly cladding tube and a channel box, and also provides such structural members within the nuclear reactor; characterized in that at least one of the structural members is made of the above-mentioned austenitic steel of the present invention, or a surface thereof which undergoes neutron irradiation and is in contact with high-temperature, high-pressure water is made of the steel of the present invention.

The present invention provides a nuclear reactor comprising structural members provided within a reactor pressure vessel which members are a neutron source pipe, a reactor core support plate, a neutron instrumentation pipe, a control rod insertion pipe, a shroud, an upper lattice plate, a fuel assembly cladding tube and a channel box; characterized in that at least one of the structural members is made of austenitic steel having a wholly austenitic structure; and that an area ratio of intergranular stress corrosion cracking, obtained when the member is irradiated with neutrons of $5 \times 10^{26}$ n/m$^2$ at 300° C., and thereafter is held in high-temperature, high-pressure water at 300° C. for 24 hours, and then is subjected to a tensile test at a strain rate of $3 \times 10^{-7}$/sec. in a room-temperature atmosphere or in high-temperature, high-pressure water, is not more than 30%.

The present invention provides a nuclear power generation plant wherein a steam turbine is rotated by heat output obtained by nuclear fuel contained in a reactor pressure vessel, and a generator is driven by the rotation of said steam turbine, thereby obtaining electrical output; characterized in that the heat output of said reactor is not less than 3200 MW, the pressure of said reactor is not less than 7.0 MPa, the temperature of said reactor is not less than 288° C. and said electrical output is not less than 1100 MW; and that at least one of structural members provided within said reactor pressure vessel, which members are a neutron source pipe, a reactor core support plate, a neutron instrumentation pipe, a control rod insertion pipe, a shroud and an upper lattice plate, can be used without replacement for not less than 30 years.

The present invention provides a nuclear power generation plant wherein a steam turbine is rotated by heat output obtained by nuclear fuel contained in a reactor pressure vessel, and a generator is driven by the rotation of said steam turbine, thereby obtaining electrical output; characterized in that the heat output of said reactor is not less than 4300 MW, the pressure of said reactor is not less than 7.2 MPa, the temperature of said reactor is not less than 288° C., and said electrical output is not less than 1,500 MW.

Naturally, the nuclear reactor and the nuclear power generation plant according to the present invention are provided in combination with the abovementioned austenitic steel. Furthermore, in order to achieve a high efficiency of the nuclear power generation, it is essential to enhance a steam condition, and therefore the steam obtained by the nuclear reactor is used in combination with a gas turbine to provide a combined cycle, and exhaust heat thereof is used to provide superheated steam of 300°–500° C., thereby achieving the above.

The present invention provides a nuclear fission reactor wherein structural members are provided within a vacuum vessel having a cooling structure, and said structural members are a diverter having a cooling structure and having a ceramics tile provided at a plasma side, and a first wall having a cooling structure and having a ceramics tile provided at the plasma side, and also provides such structural members within a nuclear fission reactor; characterized in that at least one of said structural members of the nuclear fission reactor, or at least one of a vacuum vessel having a cooling structure, a diverter having a ceramics tile and a cooling structure, and a first wall having a ceramics tile provided at a plasma side and having a cooling structure, is made of the above-mentioned austenitic steel of the present invention, or a surface which undergoes neutron irradiation and is in contact with high-temperature, high-pressure water, is made of the steel of the present invention.

Pt and Pd are the elements which occlude hydrogen are totally solid-solutioned in the matrix phase of the alloy of the present invention, and therefore as a result of addition of these elements, they combine with hydrogen, produced or intruded in the steel, to suppress the diffusion of the hydrogen to the grain boundary. Although each of these elements serves to stabilize the austenitic phase, the addition of a large amount of these elements may adversely affect the workability. And besides, the formation of a large amount of hydride in the grains may invite the risk of hydrogen cracking in the grains. Therefore, the range which is free from these problems has been limited to be 0.1–16%. 5–12% is preferred, and particularly 7–10% is more preferred. Pt and Pd are oversize atoms whose volume size factor is 41–45% (in Ni), and therefore they serve to increase an average atomic volume of the matrix phase, and adjust a volume size factor of Cr to 0.900–1.030, thus serving to suppress the mechanism of causing an irradiation-induced intergranular Cr-shortage layer.

Cr serves to enhance a corrosion resistance of the grain boundary in high-temperature water. If this content is less than 9%, the result is unsatisfactory, and if the content exceeds 26%, it is liable to form a σ phase, and adversely affects mechanical properties. Therefore, the content should be 9%–26%, and 14.5%–22% is preferred, and particularly 17%–20.6% is preferred.

Ni and Mn are the elements which are necessary to obtain an austenitic structure in the alloy. From the viewpoint of irradiation embrittlement, an alloy used under neutron irradiation should preferably have a stable austenitic phase. Particularly, 8% of Ni is necessary at the lowest, and not more than 16% Mn should be added. However, an excessive addition of Ni and Mn induces a reduced strength and the precipitation of a brittle phase, and therefore is not desirable. Therefore, with respect to the addition amount which satisfies the above-mentioned effect of stabilizing the austenitic structure in the matrix, 8–20% Ni and 0.5–16% Mn are preferred, and particularly 10–14% Ni is preferred.

The amount of Mn and the amount of Pd and Pd are correlated with each other, and as shown in FIG. 6, a range surrounded by A (0.5%, 16%), B (0.5%, 10%), C (10%, 0.1%), D (16%, 0.1%), E (16%, 7%) and F (6%, 16%) is preferred, and further the combination of the Mn content of 3–12% and the Pd or Pt content of 4–12%, the combination of the Mn content of 3–7% and the pd or Pt content of 8–12%, and the combination of the Mn content of 8–12% and the Pd or Pt content of 3–7% are preferred.

Fe is the element serving as a base for the present alloy, and in view of the so far-obtained results of use of reactor core materials, 50–70% is preferred, and particularly 50–65% is more preferred, and 52–60% is still more preferred.

From the viewpoint of enhancing a corrosion resistance in high-temperature water, it is preferred that Mo should be added in an amount of not more than 3%. However, if this content exceeds 3%, it promotes the formation of the σ phase, and adversely affects mechanical properties. 1.0–2.5% is particularly preferred.

The elements, Ti, Nb, Ta, Hf, V and Zr, are effective for a corrosion resistance and an irradiation embrittlement resistance under neutron irradiation. Particularly, these elements form fine carbides to prevent the precipitation of carbide of Cr, and prevents the Cr concentration near to the grain boundary from being decreased. However, in view of the limit of solid-solution of these elements into the Fe-Ni-Cr alloy, as well as the addition amount capable of achieving an adequate addition effect, at least one kind selected from the group consisting of Nb, Ti, Ta, Hf, V and Zr is added preferably in an amount of not more than 1%, and more preferably in an amount of 0.1–0.6%.

C reacts with Cr by neutron irradiation and by heating to precipitate carbide of Cr in the vicinity of the grain boundary to decrease the Cr concentration in the grain boundary. The occurrence of the intergranular Cr-shortage layer degrades a corrosion resistance of the grain boundary, and causes stress corrosion cracking. Therefore, the lower this content, the better, but in order to enhance the strength, this content should be not more than 0.03%. However, if this content is extremely low on the order of not more than 0.002%, the strength is lowered, and the irradiation embrittlement resistance is adversely affected, and therefore this is not desirable. Therefore, it is preferred to add not less than 0.003%, and particularly 0.008–0.020% is preferred.

The elements, P and S, are contained as incidental impurities. These impurities accumulate in the grain boundary because of an irradiation-induced intergranular segregation mechanism, and much adversely affects a corrosion resistance of the grain boundary. Therefore, preferably, P is not more than 0.05%, and S is not more than 0.003%. Si serves to suppress crevice corrosion susceptibility in an environment of neutron irradiation and high-temperature, high-pressure water, and also serves as deoxidizer in the process of producing steel. Therefore, it is not more than 1%, and preferably 0.05–1.0%. As described above, in view of the irradiation embrittlement due to neutron irradiation and an industrial process, more preferably, Si is 0.3–0.6%, P is not more than 0.01%, and S is not more than 0.002%.

By (n, p) nuclear reaction occurring due to thermal neutrons, N serves as a source of generation of hydrogen in the stainless steel, and therefore such hydrogen accumulates in the grain boundary, and this is not desirable from the viewpoint of irradiation embrittlement resistance under neutron irradiation. However, if this content is very low on the order of not more than 0.003%, the strength is lowered, and the irradiation embrittlement resistance is adversely affected, and therefore this is not desirable. Therefore, not more than 0.02% is preferred, and particularly not more than 0.01% is preferred, and 0.005–0.008% is more preferred.

The austenitic steel having the abovementioned components is produced through melting, forging, casting and a solution heat treatment, and an atmosphere in which the melting is effected is preferably vacuum. In the process of the production, coarse precipitation phases, such for example as carbide and a σ phase, are formed. In order to suppress this, the solution heat treatment is effected at a temperature of around 1050° C., and then cold rolling of not more than 50% and annealing at a temperature of 950°–1050° C. are repeated more than once, and by doing so, the formation of coarse precipitation phases can be suppressed, and the workability can be enhanced. Preferably, the steel according to the present invention should have a uniform solid solution state having a wholly austenitic phase.

In the process of producing structural members of a reactor core of a light water reactor, a heavy water reactor and a nuclear fission reactor, by repeating the annealing at a temperature of 950°–1050° C. more than once, the formation of coarse precipitation phases can be suppressed.

When the structural member or the equipment, made of austenitic steel which has a high resistance to neutron irradiation by containing the alloy element which forms hydrogen, produced in the steel, in the crystal grains of the steel, is placed in the reactor core of a light water reactor, a heavy water reactor or a nuclear fission reactor in an environment in which it undergoes neutron irradiation of not less than $10^{23}$ n/m$^2$ and is in contact with pure water of high temperature and high pressure, it is expected to exhibit an excellent corrosion resistance, as compared with conventional stainless steel of JIS304 and 316.

In the composition of the steel of the present invention, the element, such as Pt and Pd, which strongly combines with hydrogen in the steel, is solid-solutioned in the steel. By adjusting the volume size factor of Cr relative to the average atomic volume of the matrix phase to 0.900–1.030, the decrease of the amount of Cr in the grain boundary can be prevented. If this is less than 0.900, a large amount of Pt or Pd is contained, and mechanical strength and toughness are lowered, which is not desirable. And besides, a large amount of Pt or Pt causes an excessive accumulation of hydrogen in the grains, and therefore has the risk of inducing hydrogen cracking in the grain. In contrast, if the above factor exceeds 1.030, the Cr concentration in the grain boundary is made lower than the concentration of the matrix phase by the neutron irradiation, thereby inviting stress corrosion cracking, which is not desirable. And besides, the effect of trapping hydrogen in the grains can not be expected. In order to satisfy the above conditions, Pt or Pd should be added in an amount of 0.1–16%.

Preferably, at room temperature, the steel of the present invention has a yield strength of not less than 18 kgf/mm$^2$, a tensile strength of not less than 49 kgf/mm², an elongation of not less than 40%, a drawing ratio of not less than 60%, and Vickers hardness of not more than 200, and particularly a yield strength of 25–50 kgf/mm², a tensile strength of 55–80 kgf/mm² and an elongation of 40–75% are preferred.

When the steel of the present invention is used for the structural members within the abovementioned BWR nuclear reactor, the structural members within the nuclear reactor can be used for not less than 30 years without exchange, and particularly can be used in the same condition for 40 years. Particularly, this is effective in a long-term use for a nuclear reactor of a large capacity having a heat output of not less than 3,200 MW, a reactor pressure of not less than 7.0 MPa, and a temperature of not less than 288° C.

In an ABWR nuclear reactor in which the steel of the present invention is similarly used, a large-capacity design, having a heat output of not less than 4300 MW, a reactor pressure of not less than 7.2 MPa, a temperature of not less than 288° C. and an electrical output of not less than 1500 MW, can be achieved. Moreover, in this ABWR, the above structural members can be used for not less than 30 years without exchange.

Particularly, the using the steel of the present invention, an exposure rate at the time of periodic inspection can be not more than 20 msv/man year, a periodic inspection period can be within 30 days, a plant factor can be not less than 90%, a thermal efficiency can be not less than 35%, a void coefficient can be −2.8 to −4.2%, and the take-up degree of burn-up can be 45–70 GWd/t.

BRIEF DESCRIPTION OF THE DRAWINGS

FIG. 15 is a cross-sectional view of an ABWR nuclear reactor.

DESCRIPTION OF THE PREFERRED EMBODIMENTS

EXAMPLE 1

Figure 1:
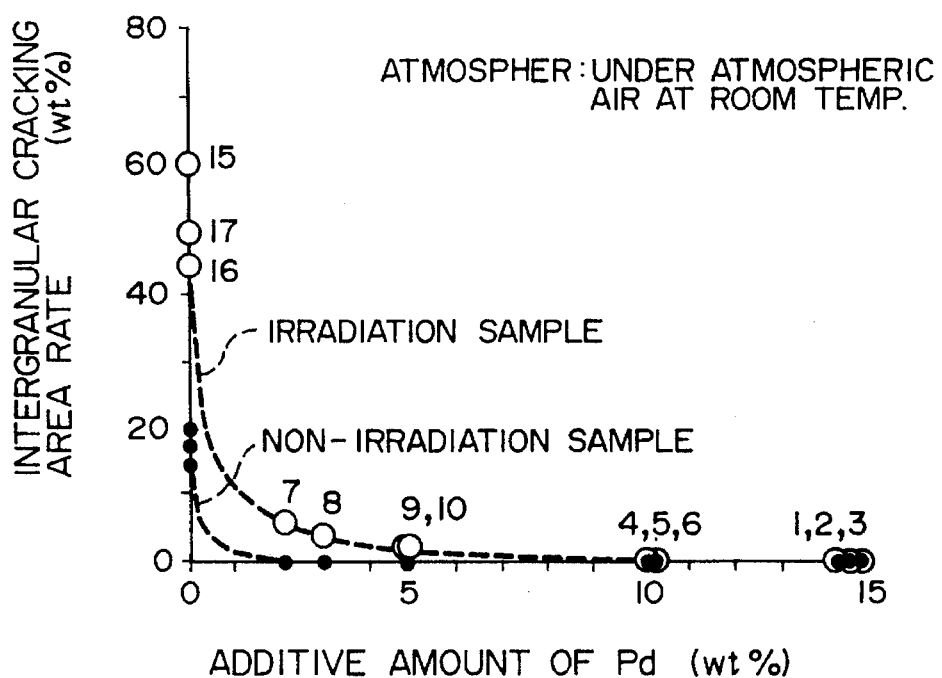
FIG. 1 is a diagram showing the relation between the amount of Pd and an intergranular cracked surface ratio.

Table 1 shows a chemical composition (weight %) of alloys related to steel of the present invention and conventional steel, and experiments (1)–(5) were conducted with respect to these steels. These steels were subjected to vacuum melting, and then to hot forging and hot rolling, and to a solution heat treatment at 1050° C., and then cold rolling and annealing were repeated to form the steel into a test piece of a desired thickness, and finally a solution heat treatment was carried out at 1050° C. for 30 minutes. Nos. 15, 16 and 17 are conventional materials, that is, JIS304 stainless steel, JIS 316 stainless steel, and Fe-15%Mn-10%Ni-23%Cr steel, respectively.

(1) Test pieces, subjected to the solution heat treatment at 1050° C. for 30 minutes, were irradiated with neutrons at a radiation rate of up to $5 \times 10^{26}$ n/m² at a temperature of 300° C., and by the use of an autoclave, hydrogen was forcibly infiltrated in the test piece in high-temperature, high-pressure water at a temperature of 300° C. for 24 hours. Then, a tensile test was effected at a strain rate of $3 \times 10^{-7}$/sec. in a room-temperature, atmospheric environment. After the test, fractured surfaces were observed using a scanning electronic microscope, and those test pieces in which the area of portions thereof subjected to intergranular cracking was small were decided to be excellent in corrosion resistance and resistance to hydrogen cracking susceptibility in high-temperature, high-pressure water.

(2) Test pieces, subjected to a solution heat treatment, neutron irradiation and forcible hydrogen infiltration as described above in Item (1), were subjected to a tensile test at a strain rate of $3 \times 10^{-7}$/sec. in an atmosphere of high-temperature (288° C.), high-pressure water. Thereafter, fractured surfaces were observed using a scanning electronic microscope, and those test pieces in which the area of portions thereof subjected to intergranular cracking was small were decided to be excellent in corrosion resistance and resistance to hydrogen cracking susceptibility in high-temperature, high-pressure water.

(3) Calculation of a volume size factor (VSF) of Cr relative to an average atomic volume of a matrix phase was carried out. This was done in the following manner. Atomic radii of γ-Fe, Cr, Ni, Mn and Pd are 1.26, 1.29, 1.25, 1.49 and 1.36 Å, respectively. The volume of one atom of each of these elements was found, and this value was multiplied by the content (weight %) of each element, and the sum was divided by 100 to determine the average atomic radius of the matrix. Ni was in the range of 5–10%, and in order to obtain a wholly austenitic structure, Ni equivalence was decided so that Ni equivalence is in a line of 0% ferrite amount shown in a Shefler state diagram of Ni equivalence and Cr equivalence. C, Si, S and P are incidental trace impurities or elements, and therefore were not taken into consideration when effecting the calculation.

TABLE 1

| No. | Pd | Pt | Mn | Ni | Cr | C | Si | Mo | Fe | VSF |
|---|---|---|---|---|---|---|---|---|---|---|
| Steel of present invention | | | | | | | | | | |
| 1 | 14.8 | — | 0.98 | 6.9 | 14.8 | 0.017 | 0.46 | 2.20 | Balance | 1.015 |
| 2 | 14.2 | — | 0.96 | 7.0 | 17.2 | 0.017 | 0.44 | 2.21 | Balance | 1.015 |
| 3 | 14.5 | — | 0.97 | 6.9 | 20.4 | 0.015 | 0.43 | 2.21 | Balance | 1.012 |
| 4 | 10.2 | — | 5.2 | 4.8 | 14.7 | 0.018 | 0.45 | 2.21 | Balance | 1.001 |
| 5 | 10.1 | — | 4.9 | 4.9 | 17.8 | 0.020 | 0.49 | 2.23 | Balance | 1.001 |
| 6 | 10.3 | — | 5.1 | 5.2 | 20.3 | 0.019 | 0.48 | 2.20 | Balance | 0.997 |
| 7 | 2.2 | — | 9.8 | 11.8 | 15.7 | 0.018 | 0.50 | 2.20 | Balance | 0.995 |
| 8 | 3.0 | — | 10.2 | 10.5 | 18.0 | 0.017 | 0.49 | 2.19 | Balance | 0.988 |
| 9 | 4.9 | — | 9.8 | 10.3 | 20.6 | 0.018 | 0.48 | 2.20 | Balance | 0.984 |
| 10 | 4.8 | — | 15.4 | 10.0 | 17.5 | 0.016 | 0.49 | 2.20 | Balance | 0.954 |
| 11 | 0.1 | — | 14.6 | 9.9 | 17.3 | 0.018 | 0.48 | 2.20 | Balance | 0.955 |
| 12 | — | 14.5 | 0.97 | 6.9 | 20.4 | 0.015 | 0.43 | 2.21 | Balance | 1.012 |
| 13 | — | 2.2 | 9.8 | 11.8 | 15.7 | 0.018 | 0.50 | 2.20 | Balance | 0.995 |
| 14 | — | 0.1 | 14.3 | 10.1 | 17.0 | 0.015 | 0.45 | 2.19 | Balance | 0.955 |
| Conventional steel | | | | | | | | | | |
| 15 | — | — | 0.9 | 9.9 | 18.3 | 0.020 | 0.51 | — | Balance | 1.056 |
| 16 | — | — | 0.9 | 12.4 | 16.9 | 0.021 | 0.43 | 2.20 | Balance | 1.059 |
| 17 | — | — | 15.0 | 9.95 | 23.0 | 0.013 | 0.46 | — | Balance | 0.966 |

(4) Test pieces, subjected to the solution heat treatment at 1050° C. for 30 minutes, were irradiated with neutrons at a radiation rate of up to $5\times10^{26}$ n/m$^2$ at a temperature of 300° C., and after the irradiation, the Cr concentration in the grain boundary was analyzed using an energy-dispersing X-ray analysis device.

(5) A comparison of stability of an austenitic phase between the steels of the present invention and the conventional steels was made using a ferrite scope.

Figure 3:
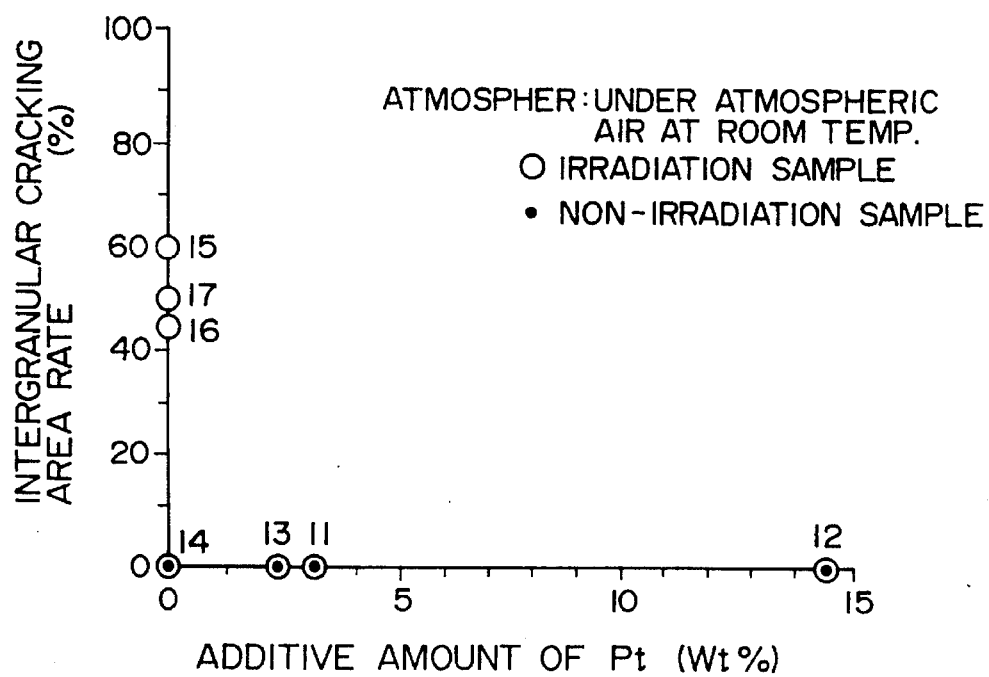
FIG. 3 is a diagram showing the relation between the amount of Pt and an intergranular cracked surface ratio.

FIGS. 1 and 3 show results of the experiment (1) in terms of correlation between an area ratio of the intergranular cracked surface and the amount of addition of Pd and Pt. It will be appreciated that with respect to both irradiated and unirradiated materials, the area ratio of the intergranular cracked surface decreases with the increase of the addition amount of Pd and Pt. This indicates that in the conventional steel, hydrogen, infiltrated into the steel, accumulated in the grain boundaries to exhibit a high hydrogen cracking susceptibility, whereas in the steel of the present invention, Pd or Pt in the steel trapped hydrogen in the grains to suppress the diffusion of the hydrogen to the grain boundaries, as well as the accumulation of the hydrogen, thereby lowering the intergranular cracking.

Figure 2:
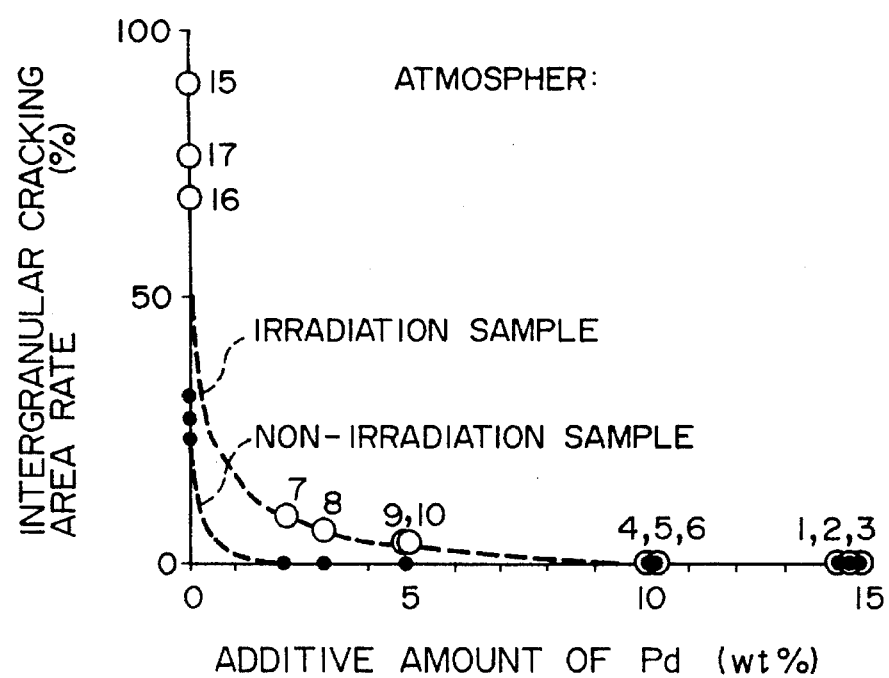
FIG. 2 is a diagram showing the relation between the amount of Pd and an intergranular cracked surface ratio.
Figure 4:
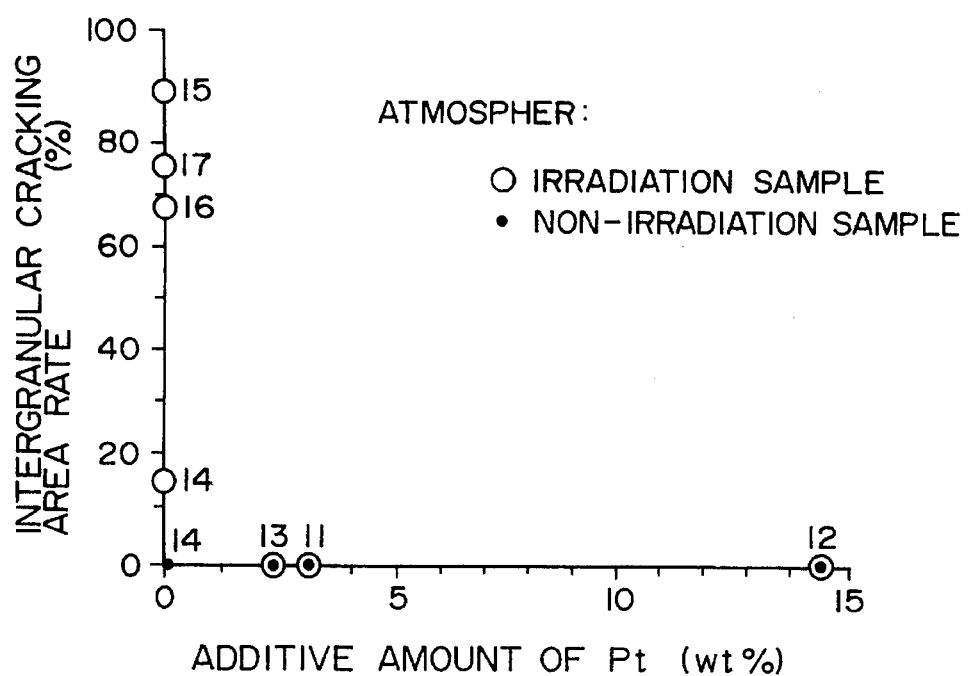
FIG. 4 is a diagram showing the relation between the amount of Pt and an intergranular cracked surface ratio.

FIGS. 2 and 4 show results of the experiment (2) in terms of correlation between an area ratio of the intergranular cracked surface and the amount of addition of Pd or Pt. As in FIGS. 1 and 3, it will be appreciated that with respect to both irradiated and unirradiated materials, the intergranular cracked surface decreases with the increase of the addition amount of Pd or Pt. This indicates that the materials exhibited better corrosion resistance than the conventional steel not only because the above-mentioned intergranular hydrogen cracking susceptibility was lowered but also because the occurrence of an intergranular Cr-shortage layer due to the irradiation was suppressed.

Although a clear effect does not appear from these Figures when the amount of addition of Pd is not more than 2%, a sufficient effect is obtained with 0.5%, and a considerably great effect is obtained with 1%. Particularly with respect to Pt, a great effect is obtained even with 0.1%.

Figure 5:
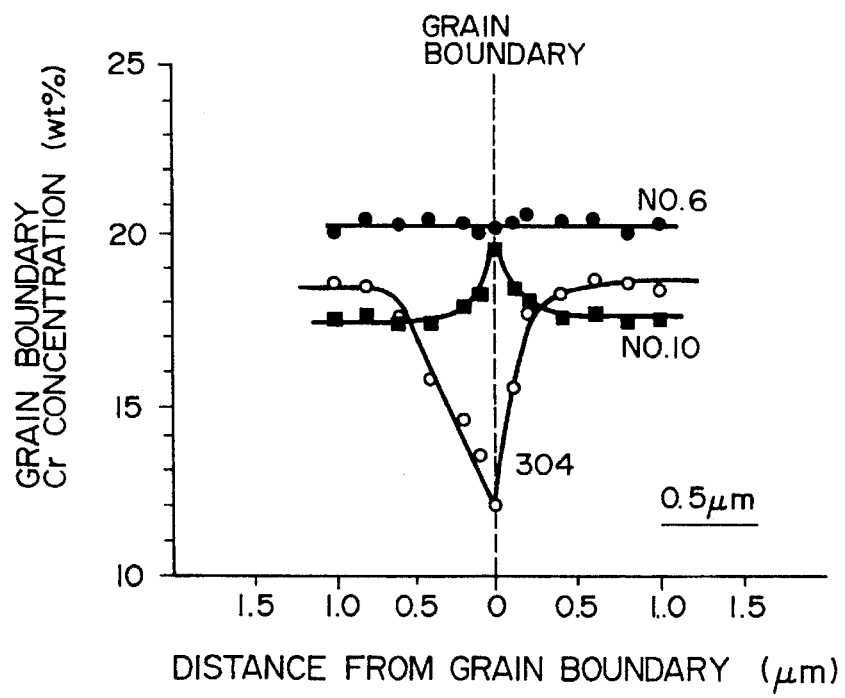
FIG. 5 is a diagram showing a Cr concentration in a grain boundary.
Figure 6:
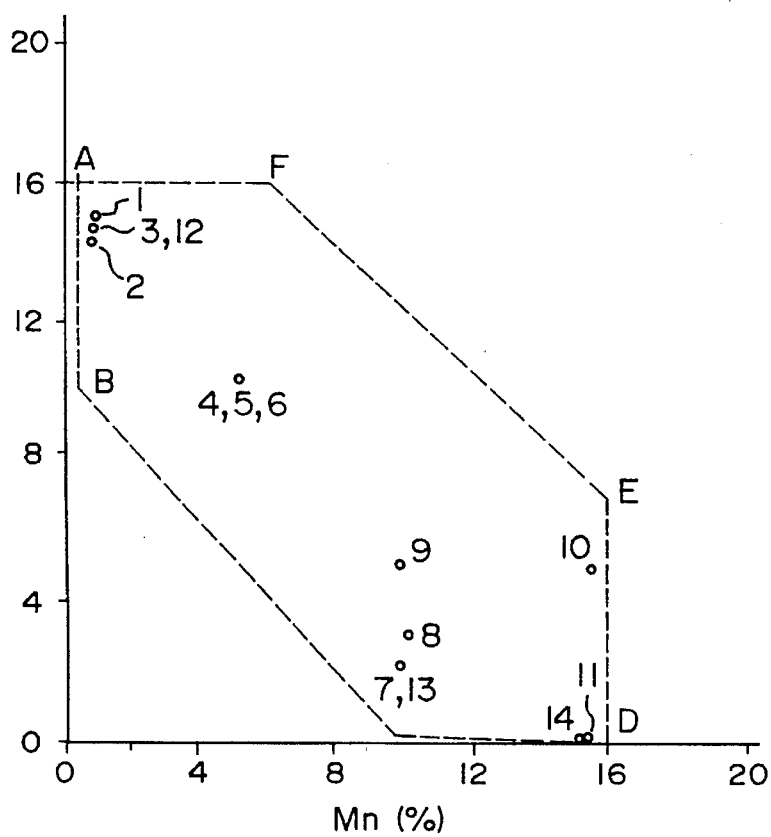
FIG. 6 is a diagram showing the relation between the amount of Mn and the amount of Pd or Pt.

FIG. 5 shows, as a typical example of results of the experiment (3), results of the Cr concentration in the grain boundary in the test piece Nos. 6 and 10 and the JIS304 stainless steel serving as the comparative material. In the conventional material containing 18% Cr in matrix, about 6% shortage of Cr (that is, 12% Cr content) occurred in the vicinity of the grain boundary. In contrast, in the Pd-added steels of Nos. 6 and 10 of the present invention, the generation of a Cr-lacking layer was not observed, and it will be appreciated that in the steel of No. 10, the Cr concentration in the grain boundary is rather increased. With the effect of addition of Pd, the values of VSF or Cr in Nos. 6 and 10 were 0.997 and 0.954 (that is, less than 1), respectively, so that Cr accumulated in the grain boundary as a result of the occurrence of an irradiation defect and the diffusion.

Table 2 shows results of the experiments (1) to (5) applied to the test pieces shown in Table 1. In the hydrogen cracking susceptibility test, results of the steels of the present invention were better than those of the conventional steels both before and after the neutron irradiation. Furthermore, in the corrosion resistance test in high-temperature water, results were better than those of the conventional steels both before and after the neutron irradiation. In view of the foregoing, Pd and Pt function to reduce the intergranular hydrogen cracking susceptibility in stainless steel, and therefore are expected to improve neutron irradiation embrittlement in an environment of a nuclear reactor core.

TABLE 2

| No. | Hydrogen cracking susceptibility | | Cr concentration in grain boundary | Corrosion resistance | | Stability of austenitic phase |
|---|---|---|---|---|---|---|
| | After irradiation | Un-irradiation | after irradiation | After irradiation | Un-irradiation | |
| Steel of present invention | | | | | | |
| 1 | ◎ | ◎ | ○ | ◎ | ◎ | ◎ |
| 2 | ◎ | ◎ | ○ | ◎ | ◎ | ◎ |
| 3 | ◎ | ◎ | ○ | ◎ | ◎ | ◎ |
| 4 | ◎ | ◎ | ○ | ◎ | ◎ | ◎ |
| 5 | ◎ | ◎ | ○ | ◎ | ◎ | ◎ |
| 6 | ◎ | ◎ | ○ | ◎ | ◎ | ◎ |
| 7 | ○ | ◎ | + | ◎ | ◎ | ◎ |
| 8 | ○ | ◎ | + | ◎ | ◎ | ◎ |
| 9 | ◎ | ◎ | + | ◎ | ◎ | ◎ |
| 10 | ◎ | ◎ | + | ◎ | ◎ | ◎ |
| 11 | ○ | ◎ | + | ◎ | ◎ | ◎ |
| 12 | ◎ | ◎ | ○ | ◎ | ◎ | ◎ |
| 13 | ○ | ◎ | + | ◎ | ◎ | ◎ |
| 14 | ○ | ◎ | + | ◎ | ◎ | ◎ |
| Conventional steel | | | | | | |
| 15 | ○ | ○ | − | ○ | ○ | ○ |
| 16 | ○ | ○ | − | ○ | ◎ | ◎ |
| 17 | ○ | ○ | + | ◎ | ○ | ◎ |
| Note | As compared with 304 steel: ◎: good ○: same level | | +: Higher than matrix phase ○: Substantially no change −: Lower than matrix phase | As compared with 304 steel: ◎: good ○: same level | | As compared with 304 steel: ◎: good ○: same level |

As shown in Table 1, the VSF value of steel Nos. 1–14 of the present invention is as small as not more than 1.03, and the value of conventional steel Nos. 15 and 16 is as high as not less than 1.056.

In steel Nos. 7–11, 13 and 14 of the present invention whose VSF is not more than 0.995, the Cr concentration in the grain boundary is increased about 2 wt. %, and therefore the resistance to SCC under neutron irradiation can be expected to be improved. In steel Nos. 1–6 of the present invention whose VSF is 0.997–1.015, a change in Cr concentration in the grain boundary is slight, and SCC susceptibility under neutron irradiation can be expected to be improved, but there is a tendency that this improvement is slightly lowered. Therefore, in order to positively suppress the Cr-shortage layer in the grain boundary under neutron irradiation, it is preferred that the VSF value be not more than 0.995. In those of conventional steels whose VSF value is more than 1.05, the Cr concentration in the grain boundary is decreased 7 wt. %, and it is thought that SCC develops under neutron irradiation in an environment of high-temperature, high-pressure water.

In the phase stabilizing test, the steels of the present invention are as stable in austenitic phase as the conventional steel such as SUS 304 steel or 316 steel, and can be expected to have characteristics equal to or better than those of the conventional materials with respect to irradiation embrittlement and mechanical properties.

The steels of the present invention had, at room temperature, a yield strength of not less than 18 kgf/mm$^2$, a tensile strength of not less than 49 kgf/mm$^2$, an elongation of not less than 40%, a drawing ratio of not less than 60%, and Vickers hardness of not more than 200.

EXAMPLE 2

Members used in a reactor core of a light water reactor undergo neutron irradiation, and it is thought that a corrosion reaction proceeds from a surface portion disposed in contact with reactor water, so that irradiation embrittlement is accelerated. Therefore, a conventional steel material such as austenitic stainless steel and low alloy steel, constituting a nuclear reactor, is modified or alloyed at a region thereof 0.1–1 mm deep from a surface thereof by the following methods, so that irradiation embrittlement of the conventional material can be stopped at the surface portion.

(1) A foil of the steel of the present invention, or Pt or Pd is affixed to a surface of a material to be modified, and by the use of a method of locally heating by a laser beam, a region not more than 1 mm deep from the surface is fused to be modified into a desired alloy composition.

(2) A welding rod is formed of an alloy of a desired composition, and a build-up welding portion is formed on a surface of a material to be modified by a TIG welding method in such a manner that the build-up welding portion has a uniform thickness not more than 1 mm from the surface, thereby forming a region of a desired alloy composition.

(3) Plating is applied to a surface of a material to be modified in such a manner that the plating layer has a thickness not more than 1 mm from the surface, and the surface is alloyed through diffusion bonding and fusion by a heat treatment. The austenitic steel of the present invention can also be in the form of a powder.

A shroud among structural members of a reactor core of a light water reactor functions to hold reactor core equipment such as fuel rods, a neutron instrumentation pipe and a control rod, and is one of heavyweight structural members which are most difficult to be exchanged from the viewpoint of the structure. In a light water reactor, a shroud is made of 304 or 316L stainless steel, and when it is used under neutron irradiation in high-temperature, high-pressure water over a long period of time, there is a fear that embrittlement due to neutron irradiation proceeds from the surface disposed in contact with reactor water. Therefore, a foil of the steel of the present invention or Pt or Pd is affixed to the whole or part of the surface of the shroud particularly subjected to marked embrittlement, and by the use of a method of locally heating by a laser beam, a region not more than 1 mm deep from the surface is fused to be modified into a desired alloy composition. By doing so, a corrosion resistance of the conventionally-used structural member which can not be exchanged can be enhanced. Also, with respect to those structural members or equipment which can be relatively easily exchanged, such as a neutron source pipe, a foil of the steel of the present invention, or Pt or Pd is affixed to a surface of a conventional material, and by the use of a method of locally heating by a laser beam, a region not more than 1 mm deep from the surface is fused to be modified into a desired alloy composition, so that an enhanced corrosion resistance of a degree as obtained with the alloy of the present invention can be achieved. This method can be applied to other structural members and equipment of a reactor core of a light water reactor than the shroud and the neutron source pipe, such as a reactor core support plate, a neutron instrumentation pipe, a control rod, an upper lattice plate, a fuel assembly channel box, a spray nozzle, a vent nozzle, a pressure vessel lid, a pressure vessel flange, a measurement nozzle, a steam separator, a shroud head, a feed water inlet nozzle, a jet pump, a recirculation water outlet nozzle, a steam dryer, a steam outlet nozzle, a feed water sparger, a reactor core spray nozzle, a lower lattice plate, a recirculation water inlet nozzle, a baffle plate and a control rod guide pipe, and a corrosion resistance can be similarly enhanced. Further, it can also be applied to structural members and equipment of a reactor core of a tokamak-type nuclear fission reactor, such as a diverter, a first wall, a cooling panel and a vacuum vessel, and a corrosion resistance can be similarly enhanced. The above application methods (2) and (3) are expected to achieve a corrosion resistance-improving effect equivalent to that of the method (1).

EXAMPLE 3

Figure 7:
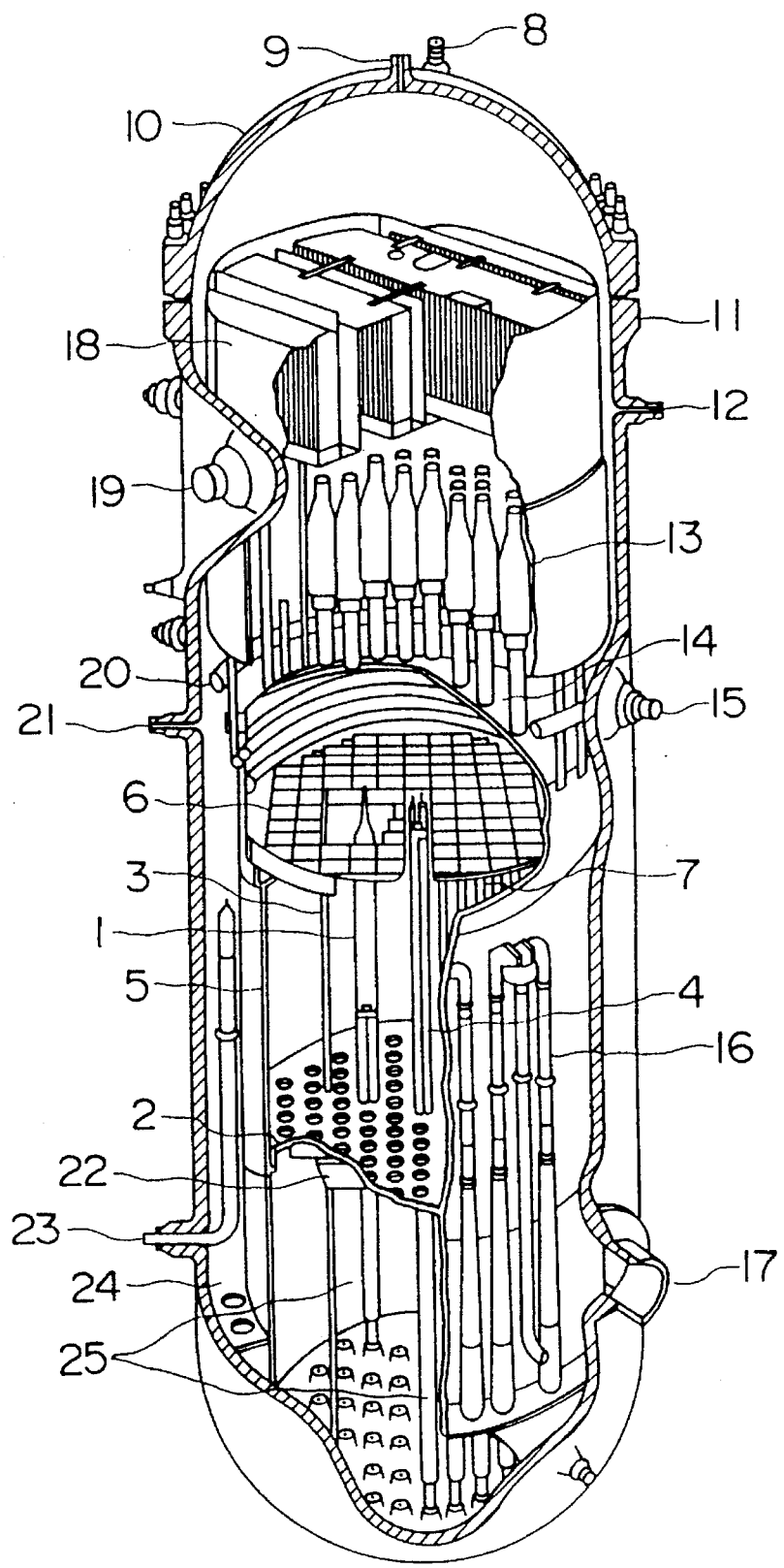
FIG. 7 is a partly cross-sectional, perspective view of a BWR nuclear reactor.

FIG. 7 is a schematic, cross-sectional, perspective view of a reactor core portion of a boiling light water reactor (BWR). In this Figure, 1 denotes a neutron source pipe, 2 a reactor core support plate, 3 a neutron instrumentation pipe, 4 a control rod, 5 a reactor core shroud, and 6 an upper lattice plate. These structural members and equipment constitute a reactor core of the light water reactor, and undergo a large amount of neutron irradiation, and are used in high-temperature (288° C.), high-pressure (7 MPa) water. By making these structural members and equipment from the steel of the present invention, the intergranular hydrogen cracking susceptibility under neutron irradiation can be reduced, and the resistance to irradiation embrittlement can be enhanced. By using the steel of the present invention for parts used in these structural members and equipment, a similar effect can be expected. Further, when the steel of the present invention is used for structural members and equipment of a reactor core of a pressurized water nuclear reactor other than the boiling water type, a similar effect can be expected.

The reactor core includes, in addition to the above equipment, the following construction; a fuel assembly 7, a spray nozzle 8, a vent nozzle 9, a pressure vessel lid 10, a pressure vessel flange 11, a measurement nozzle 12, a steam separator 13, a shroud head 14, a feed water inlet nozzle 15, a jet pump 16, a recirculation water outlet nozzle 17, a steam dryer 18, a steam outlet nozzle 19, a feed water sparger 20, a reactor core spray nozzle 21, a lower lattice plate 22, a recirculation water inlet nozzle 23, a baffle plate 24 and a control rod guide pipe 25.

Figure 8:
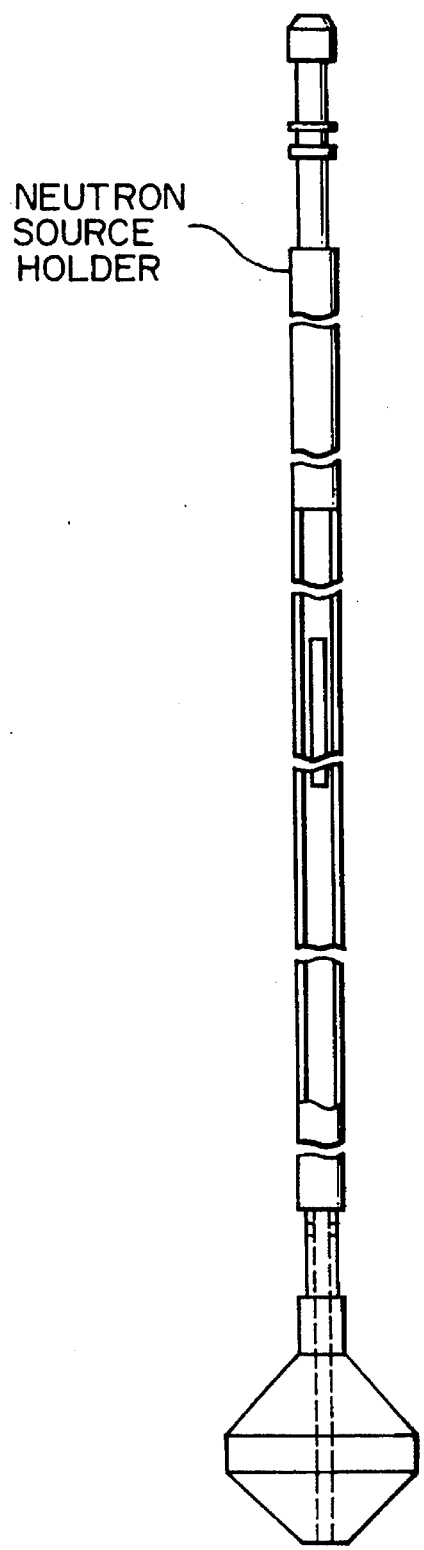
FIG. 8 is a partly cross-sectional view of a neutron source pipe.

FIG. 8 is partly cross-sectional, perspective view of the neutron source pipe, and in this Example, it was made of alloy of No. 9 shown in Table 1. A pipe portion of this pipe was formed into a seamless pipe by hot processing, and an upper bar-like portion and a lower thickened portion were formed by hot forging and a heat treatment similar to the production process described in Example 1. All of joint portions were joined by electron beam welding.

Figure 9:
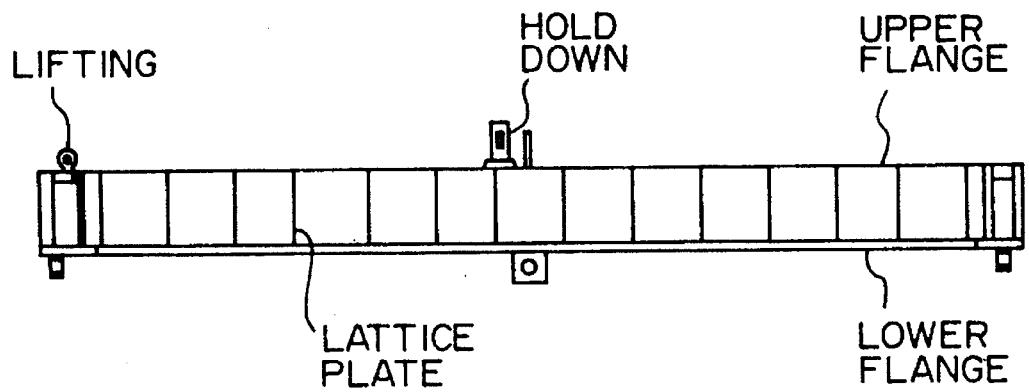
FIG. 9 is a front elevational view of an upper lattice plate.
Figure 10:
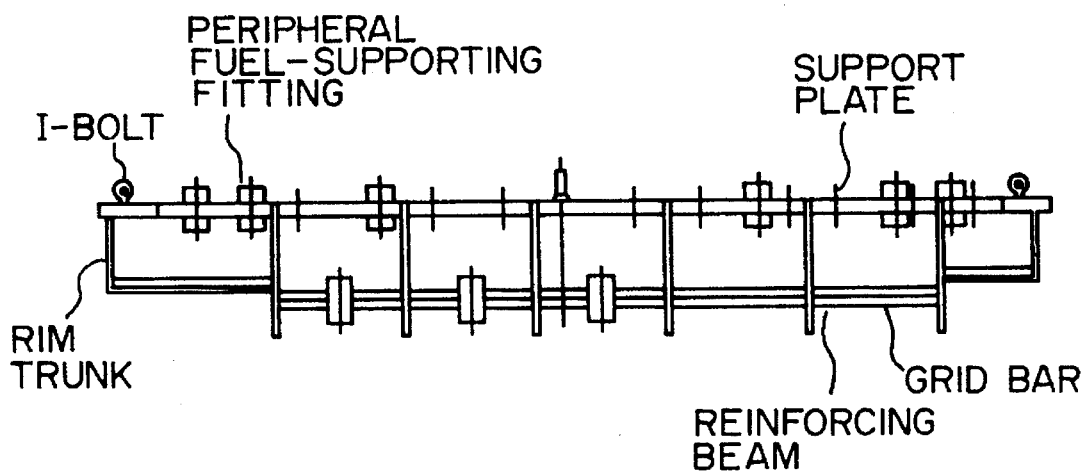
FIG. 10 is a front-elevational view of a reactor core support plate.

FIG. 9 is a cross-sectional view showing a cut surface of the circular upper lattice plate 6, and FIG. 10 is a cross-sectional view showing a cut surface of the circular reactor core support plate 2. These structural members were formed by welding, using a plate which was made of alloy of No. 9 shown in Table 1, and was subjected to hot rolling and a heat treatment as described for the production method of Example 1.

Figure 11:
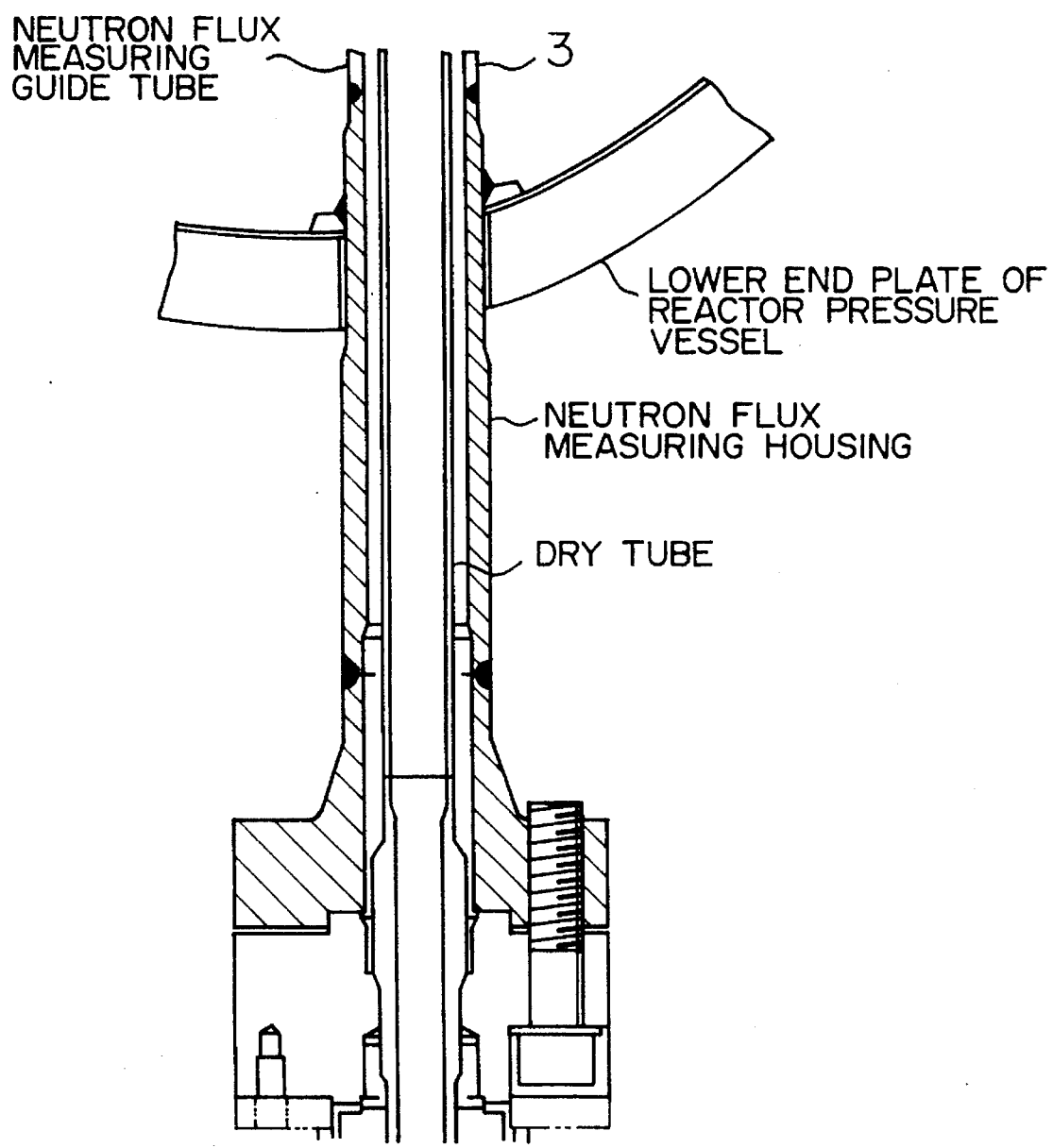
FIG. 11 is a cross-sectional view of a neutron instrumentation pipe.

FIG. 11 is an enlarged cross-sectional view of the reactor core portion, showing the neutron instrumentation pipe 3. The neutron instrumentation pipe is connected by welding to a housing connected by welding to a lower end plate of the reactor pressure vessel. In this Example, the seamless neutron instrumentation pipe was formed of alloy of No. 9 shown in Table 1, and a final heat treatment as described in Example 1 was applied to it.

Figure 12:
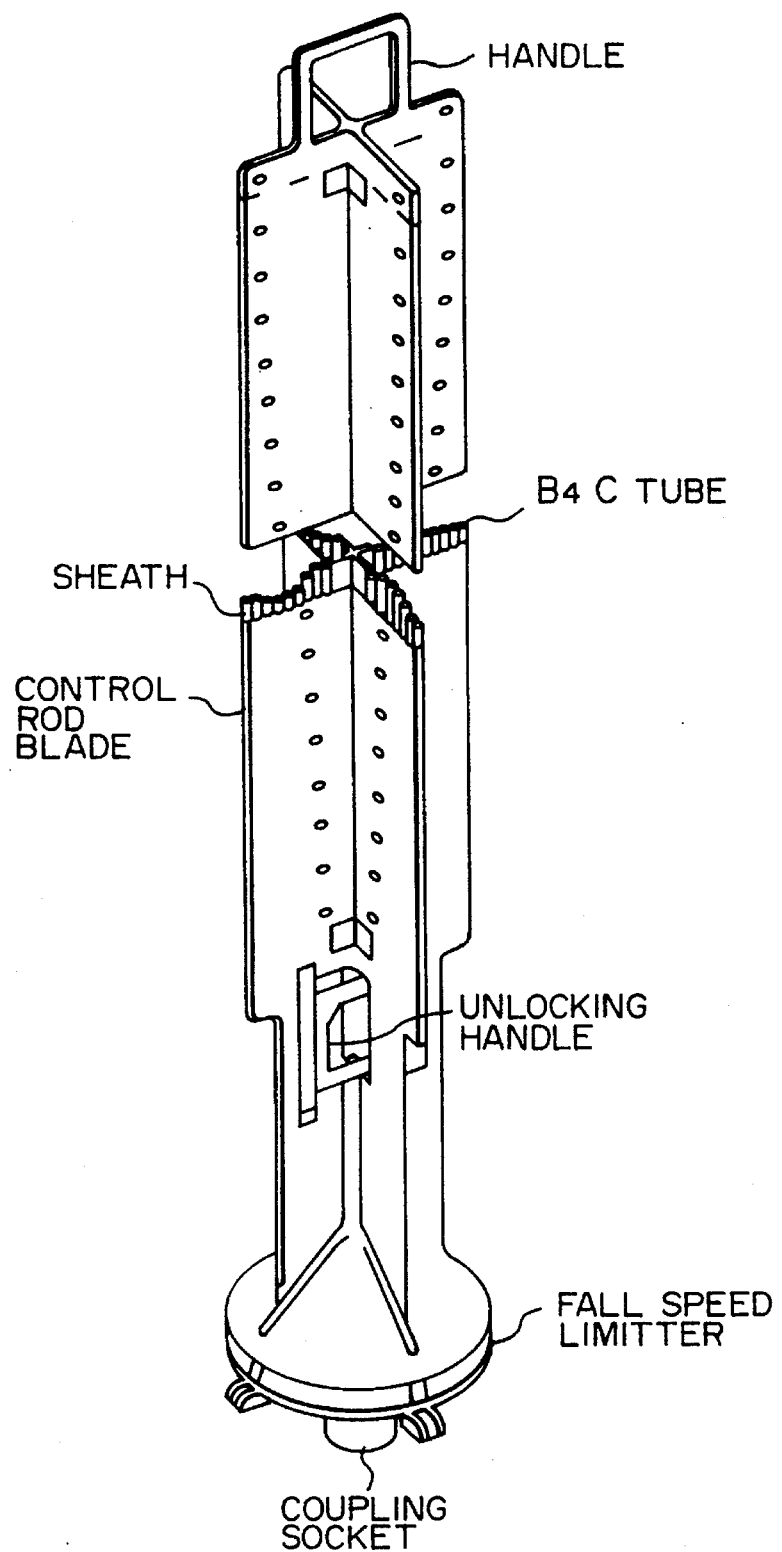
FIG. 12 is a partly cross-sectional perspective view of a control rod.

FIG. 12 is a perspective view of the control rod, and in this Example, a sheath and a $B_4C$ tube were made of alloy of No. 9 shown in Table 1. The $B_4C$ tube was obtained by forming a tube by hot processing, and then by repeating cold rolling and annealing by the use of a pilger mill. The sheath was obtained by repeating cold rolling and annealing to form a thin sheet, and then by welding.

Figure 13:
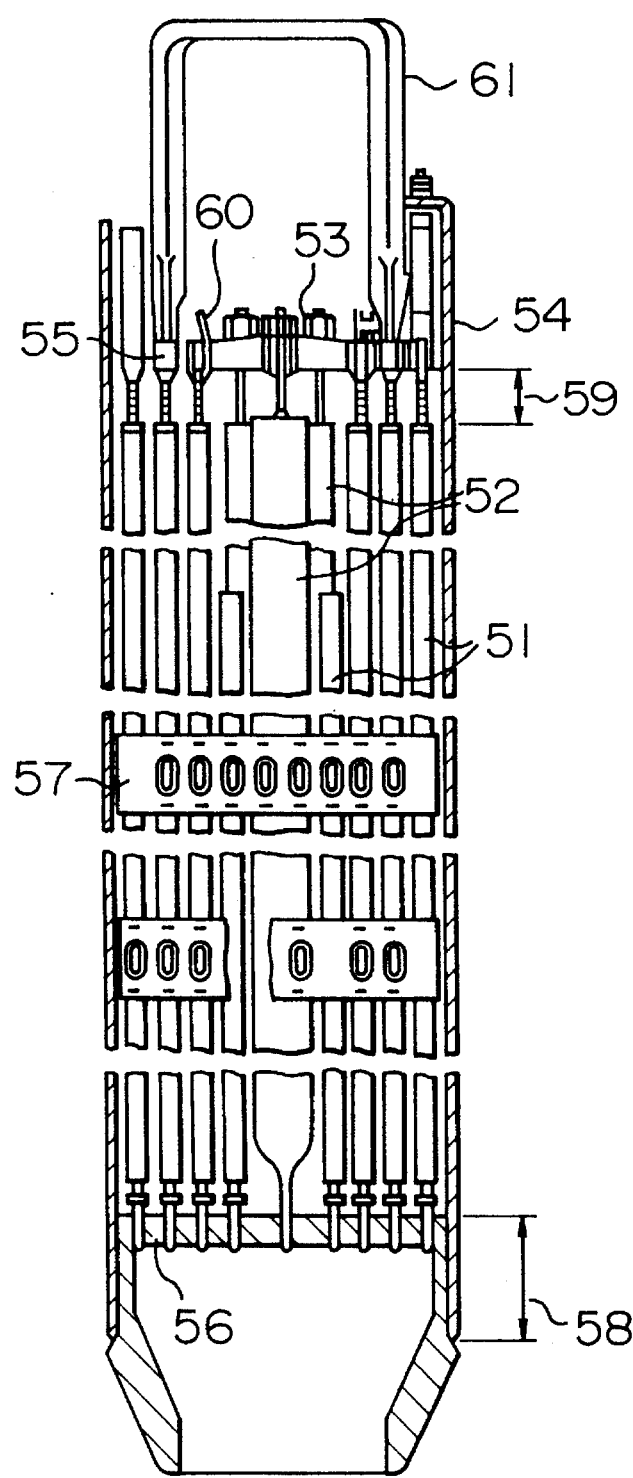
FIG. 13 is a cross-sectional view of a fuel assembly.

FIG. 13 is a cross-sectional view of a portion of the fuel assembly 7. The fuel assembly 7 mainly comprises fuel rods 51, water rods 52, a channel box 54, an upper tie plate 55, a lower tie plate 56, a spacer 57, and a handle 61, and a number of bolts and nuts for fastening purposes are used. The alloy of the present invention can be used for these structural members. Structural materials for the handle and the upper and lower tie plates are subjected to a solution heat treatment after hot forging, and thin plates for the channel box and the spacer are subjected to a solution heat treatment after hot rolling, and are repeatedly subjected to cold rolling and annealing. A cover tube for the fuel rod, as well as a thin tube of the water rod, is produced by a pilger mill.

Figure 14:
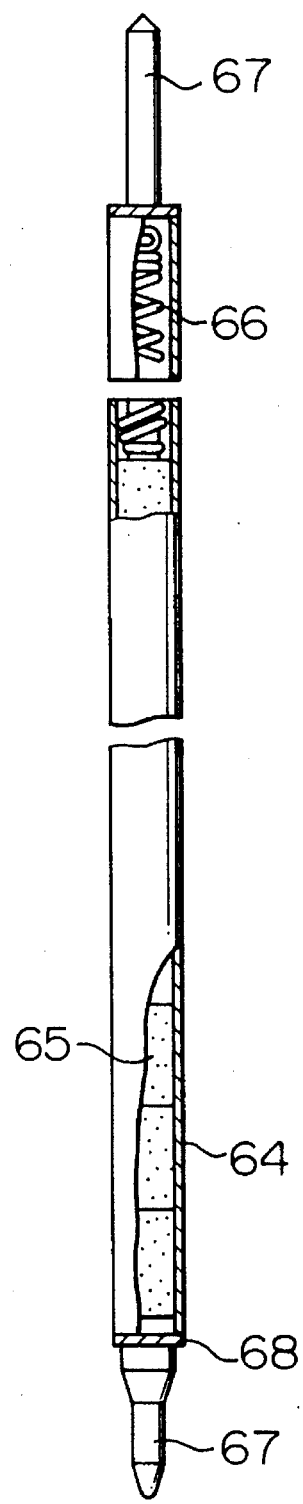
FIG. 14 is a partly cross-sectional view of a fuel rod.

FIG. 14 is a partly cross-sectional view of the fuel rod, and the alloy of the present invention is used for the cover tube 64 and end plugs 67.

A main specification of the BWR power generation plant of the above construction is shown in Table 3. In this Example, any of the members made of the alloy of the present invention can be used for 30 years without exchange, and further it is expected that they can be used for 40 years without exchange with the aid of inspection. The temperature of the nuclear reactor is 288° C., and a periodic inspection is repeatedly carried out within 50 days during a 12-month operation.

TABLE 3

| Item | | BWR |
|---|---|---|
| Electrical output | | about 1,100 MW |
| Heat output | | 3,293 MW |
| Reactor pressure | | about 7.03 MPa |
| Fuel assembly | | 764 |
| Number of control rods | | 185 |
| Reactor pressure vessel | Inner diameter | about 6.4 m |
| | Height | about 22 m |
| Reactor recirculation system | | External recirculation pumps (2) and jet pumps (20) |
| Control rod drive device | Output control | Hydraulic drive |
| | Scram | Hydraulically-driven, high-speed scram |
| Emergency core cooling system | | Low-pressure injection system (three lines) |
| | | Low-pressure core spray system |
| | | High-pressure core spray system |
| | | Automatic pressure decrease system |
| Residual heat removal system | | Two lines |
| Containment vessel | | Self-supported steel |
| Main turbine | Type | TC6F-41 |
| | Thermal cycle | Non-reheat |
| Nuclear reactor | Feed water temperature | 215.5° C. |
| Turbine | Rated electrical output | 1,100 MW |
| | Main steam pressure | 6.65 MPa (abs) |
| | Number of revolutions | 1,500 r/min |
| Condenser | Rated vacuum degree | 5.07 kPa (abs) |
| | Cooling pipe material | Titanium |
| | Built-in heater | Four (low pressure) |
| Moisture separation heater | Type | Non-reheat type |
| Main steam system | Main steam line introduction | Front entry |
| Feed of condensed water | Feed water pump | Two (Turbine-driven feed water pumps) |
| | | Two (Motor-driven feed water pumps) |
| | Heater drain | Cascade |
| Generator | Type | TFLQQ·KD |
| | Rated output | 1,300 MVA |
| | Number of poles | 4 |
| | Power factor | 0.9 |

EXAMPLE 4

FIG. 15 is a cross-sectional view of an advanced boiling water nuclear reactor (ABWR).

A reactor pressure vessel is a central equipment of a nuclear power generation plant, and particularly, ABWR has a nozzle construction for mounting an internal pump 26 which is not provided in BWR. An optimum configuration of this nozzle portion is such a sleeve-like configuration that even when temperature and pressure changes occur within the reactor pressure vessel, it will not affect the rotational function of the internal pump 26, and will transfer less heat to a motor portion.

Taking the condition of partial operation of the internal pumps 26 into consideration, the accuracy of measurement of a flow rate in a reactor core is secured by tests including experiments. The rate of flow of steam in a turbine is measured by a Venturi structure provided at a main steam nozzle portion of the reactor pressure vessel, and the accuracy of the measurement is sufficiently secured. Reference numeral 27 denotes a support skirt (conical shape), and reference numeral 28 denotes a high-pressure core injection sparger.

RPV (reactor pressure vessel) constitutes a pressure boundary for coolant, and also contains and holds internal structural members of the reactor core and the pressure vessel.

(1) Increase of Inner Diameter of Pressure Vessel

The RPV of the BWR contains the fuel assembly (764 pieces), the jet pumps and the internal structural members, and has an inner diameter of about 6.4 m. However, in the ABWR, the number of the fuel assembly pieces is increased to 872, and a space for enabling the handling of the internal pumps within the reactor core is secured, and therefore the inner diameter is about 7.1 m.

(2) Decrease of Inner Height of Pressure Vessel

The inner height of the RPV of the BWR is about 22 m whereas the inner height in the ABWR is about 21 m because of the following factors (a)–(d).
(a) The length of a stand pipe is reduced as a result of adopting a high-efficiency steam separator.
(b) The need for a control rod drop speed-limiting device is obviated as a result of adopting FMCRD.
(c) The height of an upper lid is reduced as a result of modifying an upper lid-main flange structure.
(d) The height is reduced as a result of adopting a lower end plate of a dish-shape.

(3) Modification of Configuration of Lower End Plate

In order to secure a space necessary for mounting the internal pumps on the lower portion of the pressure vessel as a result of adopting the internal pumps, and also in view of a flow passage of cooling water, the lower end plate is changed from a semispherical shape as in BWR to a dish-shape. The internal pump nozzle is forged into an integral construction, thus providing a design in which the number of welding lines is not increased.

Table 4 shows items of structural members within the reactor core as compared with those of the above-mentioned BWR.

Within the RPV, the structural members within the reactor core perform main functions of supporting the reactor core, forming the flow passage for the coolant, and separating hot water and steam, produced in the reactor core, from each other, and also serve to secure a passage of injection of cooling water to the reactor core at the time of a hypothetical accident. Thus, in view of their nature, the structural members are required to have sufficient soundness and reliability.

TABLE 4

| Item | ABWR | BWR |
|---|---|---|
| Steam separator | Double pipe, 3-stage type × 349 pieces | Triple pipe, 2-stage type × 225 pieces |
| Feed water sparger thermal sleeve | Welding-type double thermal sleeve | Welding-type single thermal sleeve |
| High-pressure core injection sparger | Injection system | Spary system |
| Low-pressure injection sparger | Downcomer injection system | In-shroud injection system |
| Upper lattice plate | Integrally skived type | Lattice plate fitting type |
| Reactor core support plate | Cross reinforced beam | Parallel reinforced beam |
| Incore stabilizer | 2-stage, Shroud fixed | 1-stage, not fixed by shroud |
| Control rod | No speed limiter | Provision of speed limiter |
|  | Bionet coupling system | Spud coupling system |
| Shroud support leg | Height: 21.7 inch 10 (provided between internal pumps) | Height: 57.5 inch 12 |

Those respects of the ABWR different from the above-mentioned BWR have been described, and the other structural members of the ABWR of this Example were produced in a similar manner as described for the above BWR.

A main specification of an ABWR power generation plant obtained by the above construction is shown in Table 5. In this Example, each of the members made of the alloy of the present invention can meet with a large-capacity design, and it is expected that each member can be used for 30 years without exchange. The temperature of the nuclear reactor is 288° C., and a periodic inspection was repeatedly carried out within 40 days during a 12-month operation, and it is thought that a non-exchange operation can be carried out for 40 years.

TABLE 5

| Item | | ABWR |
|---|---|---|
| Electrical output | | about 1,356 MW |
| Heat output | | 3,926 MW |
| Reactor pressure | | about 7.17 MPa |
| Fuel assembly | | 872 |
| Number of control rods | | 205 |
| Reactor pressure vessel | Inner diameter | about 7.1 m |
|  | Height | about 21 m |
| Reactor recirculation system | | Internal pump system (10) |
| Control rod drive device | Output control | Fine adjustment motor drive |
|  | Scram | Hydraulically-driven, high-speed scram |
| Emergency core cooling system | | Low-pressure injection system (three lines) High-pressure core injection system (two lines) Cooling system at the time of isolation of reactor Automatic pressure decrease system |
| Residual heat removal system | | Three lines |
| Containment vessel | | Reinforced concrete with steel liner |

TABLE 5-continued

| Item | | ABWR |
|---|---|---|
| Main turbine | Type | TC6F-52 |
|  | Thermal cycle | 2-state reheat |
| Nuclear reactor | Feed water temperature | 215° C. |
| Turbine | Rated electrical output | 1,356 MW |
|  | Main steam pressure | 6.79 MPa (abs) |
|  | Number of revolutions | 1,500 r/min |
| Condenser | Rated vacuum degree | 5.07 kPa (abs) |
|  | Cooling pipe material | Titanium |
|  | Built-in heater | Four (low pressure) |
| Moisture separation heater | Type | 2-stage reheat type |
| Main steam system | Main steam line introduction | Side entry |
| Feed of condensed water | Feed water pump | Two (Turbine-driven feed water pumps) One (Motor-driven feed water pumps) |
|  | Heater drain | Pump-up |
| Generator | Type | TFLQQ•KD |
|  | Rated output | 1,540 MVA |
|  | Number of poles | 4 |
|  | Power factor | 0.9 |

EXAMPLE 5

This is an example in which the ABWR of Example 4 is further increased in capacity, and a fundamental construction of this Example is substantially the same as that of Example 4. With respect to a main specification of the capacity, a reactor heat output is 4500 MW, an electrical output is 1600 MW, a reactor pressure is 7.3 MPa, and the temperature is 288° C. With a high-pressure design, embrittlement due to absorption of hydrogen becomes a problem, as described in the Examples of the invention; however, when each of structural members within a reactor pressure vessel is made of similar alloy as described above in Example 1, a fear for embrittlement is eliminated, and the operation can be carried out over a long period of time.

EXAMPLE 6

Figure 16:
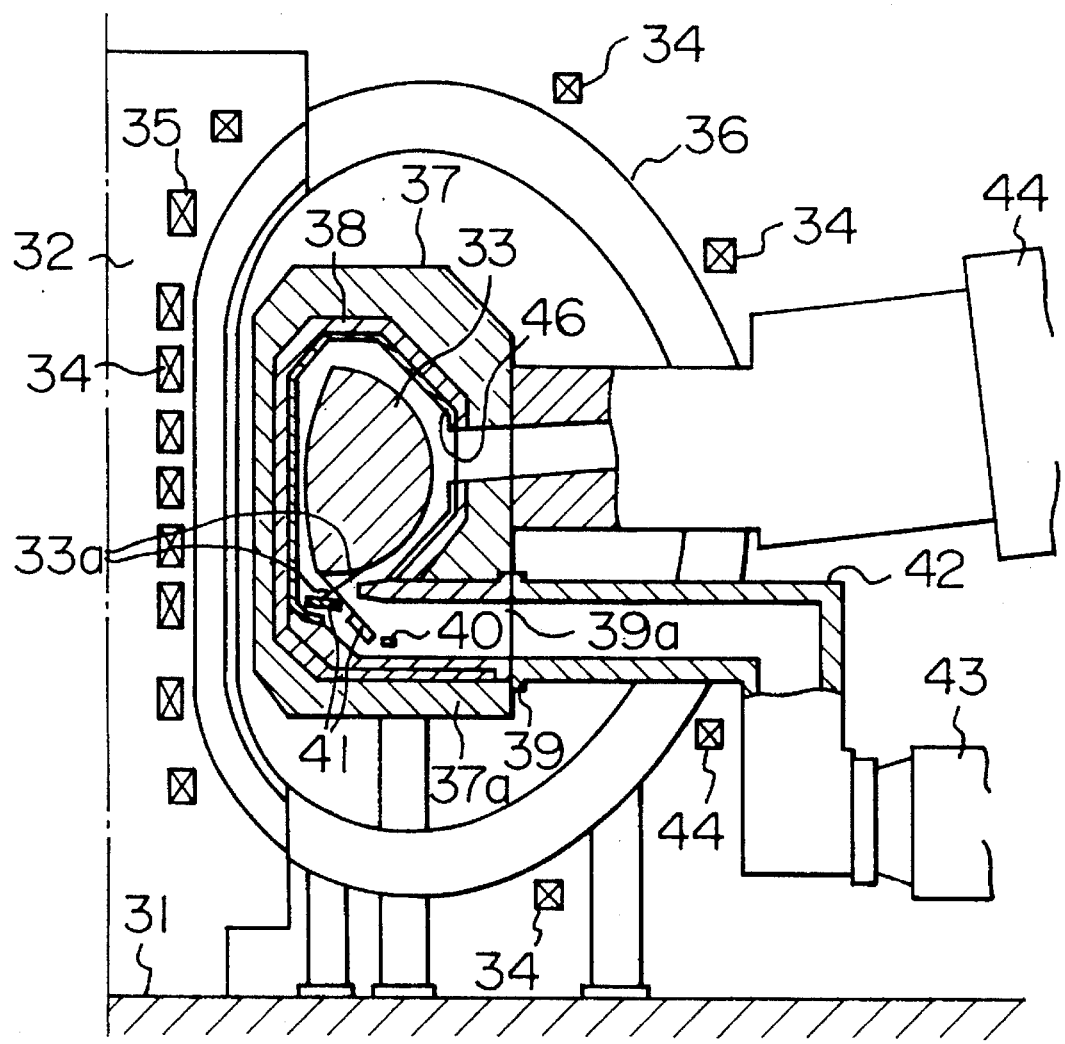
FIG. 16 is a cross-sectional view of a nuclear fusion reactor.

FIG. 16 is a vertical cross-sectional view showing a general construction of a torus-type nuclear fusion apparatus. In this Figure, poloidal field coils 34 and a diverter coil 35 for heating and controlling plasma 33 are provided on a base 31, and deuterium or tritium is fed as fuel into the inside of a blanket 38 to produce the plasma 33, which blanket is provided within a hollow doughnut-shaped vacuum vessel 37 provided inside of a toroidal field coil 36 for confining the plasma 3, the blanket 38 effecting heat exchange by supply of coolant such as helium. A shield tube 39 is fitted in a lower portion 37a of the vacuum vessel 37, and part 33a (impurities such as He) of the plasma derived from the plasma 33 is caused to impinge on diverter plates 41 which are provided within the shield tube 39, connected to the diverter coil 35, and are supported by cooling pipe headers 40. An exhaust pump 43 is connected to an opening 39a of the shield tube 39 via an exhaust pipe 42, and a neutral particle supply device 44 is mounted on that portion of the vacuum vessel 37 disposed above the exhaust pipe 42.

In the nuclear fusion apparatus, deuterium or the like is fed into the vacuum vessel 37 having a cooling structure, and on the other hand, electric current is applied to the poloidal field coils 34, the diverter coil 35 and the toroidal field coil 36 to replace the deuterium or the like in the vacuum vessel 37 with the plasma 33, and neutral particles are applied into the vacuum vessel 37 by the neutral particle supply device 44 to effect a secondary heating of the plasma 33, and the heat energy produced in the plasma 33 effects heat exchange with the coolant flowing in the blanket 38, and this coolant subjected to the heat exchange is taken out of the apparatus. By doing so, for example, a turbine can be driven. The impurities, produced by sputtering of the plasma 33 within the vacuum vessel 37, not only lowers the plasma producing efficiency, but also causes damage to the surface of the vacuum vessel 37 because of high temperature. Therefore, in order to remove the impurities causing this damage, the diverter plates 41 are provided, and the impurities are caused to impinge on the diverter plates 41 to be removed. A first wall 46 is provided on the inside of the blanket 38, and ceramics tiles 48 are metal-bonded to a metal base 47 cooled by water.

Figure 17:
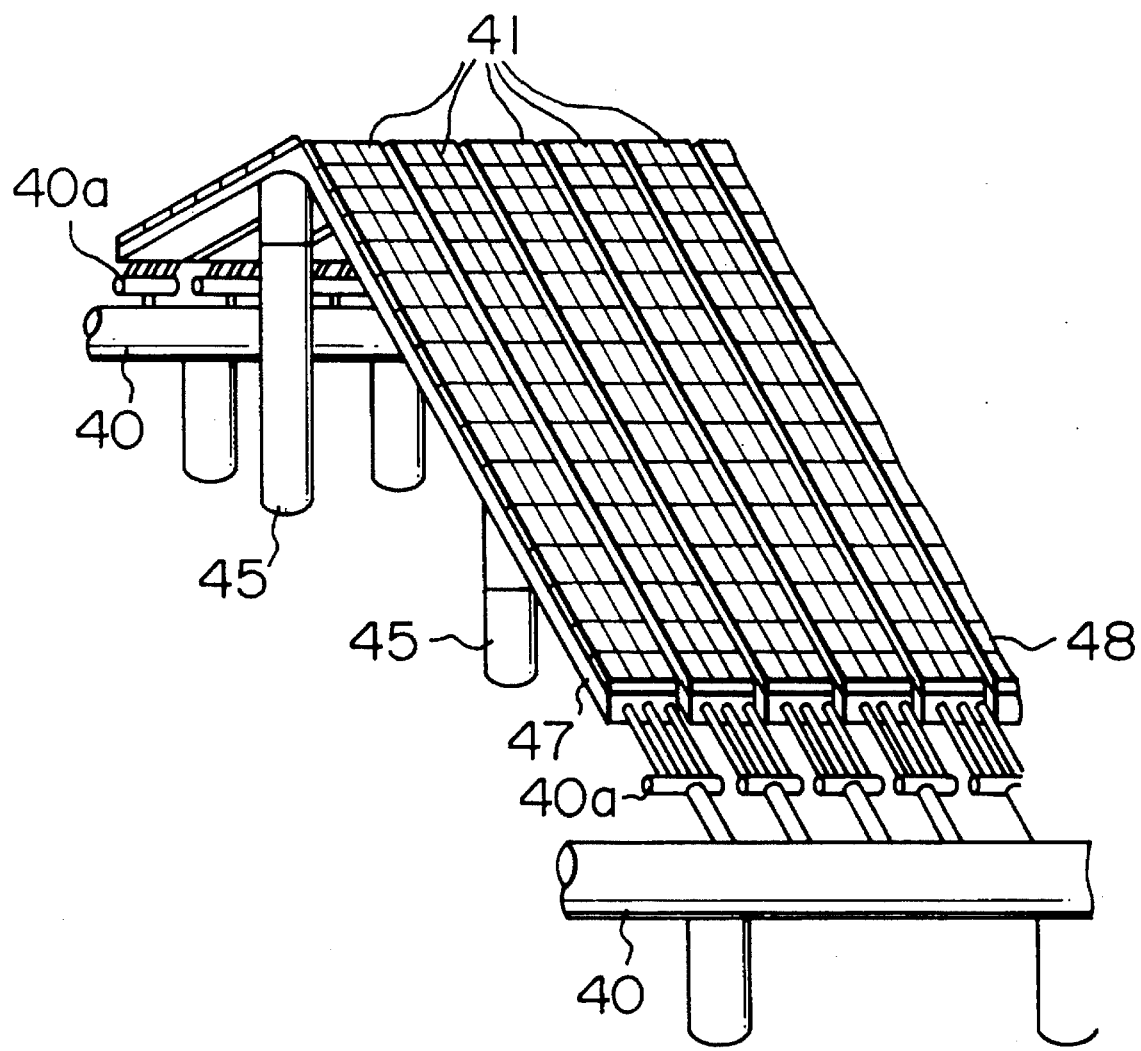
FIG. 17 is a perspective view of a diverter.

FIG. 17 shows a general construction of the diverter plate 41. In this Figure, a high thermal load from the plasma acts on the diverter plate 41, and also eddy current produced in the diverter plate 41 acts, as a large electromagnetic force, on the diverter plate. A plurality of diverter plates 41 comprising long plates are arranged in the direction of the torus, and are supported by the cooling pipe headers 40, sub-headers 40a and support bases 45 mounted on the lower surfaces of the diverter plates 41. A plurality of diverter plates 41 are provided as one block, and a plurality of blocks are arranged in the direction of the torus. Each block has such a construction that the ceramics tiles 48 are connected to the water-cooled metal base 47. Preferably, the ceramics tile 48 has a high thermal conductivity of not less than 0.2 cal/cm•sec•°C., and particularly it is preferred to use a sintered material of SiC containing 0.2–2 wt. % of Be or a Be compound, a sintered material of AlN, or a sintered material of AlN containing a similar amount of Be compound as described above.

In the Example, each of the diverter 41, the vacuum vessel 37 and the first wall 46 is of such a construction that it is irradiated with a large amount of neutrons and various corpuscular rays leaked from the plasma, and is in contact with water for cooling purposes, and therefore these are in contact with high-temperature water. By forming the metal base of these structural members from the steel of No. 9 shown in Table 1, the intergranular hydrogen cracking susceptibility under neutron irradiation can be lowered, thereby enhancing the resistance to irradiation embrittlement.

Each of these structural members is subjected to hot rolling as described in Example 1, and thereafter is repeatedly subjected to cold rolling and annealing, and then is subjected to a solution heat treatment at 1050° C. for 30 minutes as described above, and has a wholly austenitic phase.

According to the present invention, the structural members or equipment, used in an environment in which they undergo high-velocity neutron irradiation of not less than $10^{23}$ n/m$^2$, and are in contact with high-temperature water or high-temperature, high-pressure water, can be improved in irradiation embrittlement occurring due to the intergranular hydrogen embrittlement, and by using the steel of the present invention for the structural members and equipment of the nuclear reactor, the vacuum vessel of the nuclear fusion reactor, and the structural members and equipment within this vacuum vessel, a high reliability can be obtained, and also the effect of enhancing the condition of use is obtained.

According to the present invention, a long-term operation can be effected in the nuclear reactor and the nuclear fusion reactor, and the nuclear power generation plant of a large capacity is possible.

What is claimed is:

1. A structural member having a superior resistance to neutron irradiation embrittlement, comprising a surface used in contact with water under neutron irradiation, at least said surface of said member being made of austenitic steel containing, by weight, not more than 0.02% C, not more than 1% Si, 0.5–15% Mn, 9–22% Cr, 8–14% Ni, at least one kind selected from the group consisting of 2.2–16% Pt and 2.2–16% Pd, and not less than 50% Fe, a volume size factor of Cr of said austenitic steel relative to an average atomic volume of a matrix phase thereof being 0.900–1.030.

2. Austenitic steel having a superior resistance to neutron irradiation embrittlement, said steel consisting essentially, by weight, of not more than 0.02% C, not more than 1% Si, not more than 0.02% P, not more than 0.02% N, 0.5–16% Mn, 9–22% Cr, 8–14% Ni, 0.5–3% Mo, at least one kind selected from the group consisting of 2.2–16% Pt and 2.2–16% Pd, and not less than 50% Fe, a volume size factor of Cr of said austenitic steel relative to an average atomic volume of a matrix phase thereof being 0.900–1.030.

3. Austenitic steel having a superior resistance to neutron irradiation embrittlement, said steel consisting essentially, by weight, of not more than 0.02% C, not more than 1% Si, not more than 0.02% P, not more than 0.02% C, not more than 1% Si, not more than 0.02% P, not more than 0.02% N, 0.5–16% Mn, 9–22% Cr, 8–14% Ni, 0.5–3% Mo, at least one material selected from the group consisting of 2.2–16% Pt and 2.2–16% Pd, not more than 1.0% of at least one kind selected from the group consisting of Nb, Ti, Zr, Ta, Hf and V, and not less than 50% Fe, a volume size factor of Cr of said austenitic steel relative to an average atomic volume of a matrix phase thereof being 0.900–1.030.

4. A structural member according to claim 1, in which a region not more than 1 mm deep from the surface of said member has a superior resistance to neutron irradiation embrittlement.

5. A nuclear reactor comprising structural members provided within a reactor pressure vessel which members are a neutron source pipe, a reactor core support plate, a neutron instrumentation pipe, a control rod insertion pipe, a shroud, an upper lattice plate, a fuel assembly cladding tube and a channel box, at least a surface portion of at least one of said structural members being made of austenitic steel which has a wholly austenitic structure and which consists essentially, by weight, of not more than 0.02% C, not more than 1% Si, not more than 0.02% P, not more than 0.02% N, 0.5–16% Mn, 9–22% Cr, 8–14% Ni, 0.5–3% Mo, at least one kind selected from the group consisting of 2.2–16% Pt and 2.2–16% Pd, at least one material of not more than 1.0% (including 0%) in total selected from the group consisting of Nb, Ti, Zr, Ta, Hf and V, and not less than 50% Fe, a volume size factor of Cr of said austenitic steel relative to an average atomic volume of a matrix phase thereof being 0.900–1.030.

6. A nuclear reactor comprising structural members which are a neutron source pipe, a reactor core support plate, a neutron instrumentation pipe, a control rod insertion pipe, a shroud, an upper lattice plate, a fuel assembly cladding tube and a channel box, at least a surface portion of at least one of said structural members being provided with a surface layer made of austenitic steel which has a wholly austenitic structure and which consists essentially, by weight, of not more than 0.02% C, not more than 1% Si, not more than 0.02% P, not more than 0.01% N, 0.5–16% Mn, 9–22% Cr, 8–14% Ni, 0.5–3% Mo, at least one kind selected from the group consisting of 2.2–16% Pt and 2.2–16% Pd, at least one material of not more than 1.0% (including 0%) in total selected from the group consisting of Nb, Ti, Zr, Ta, Hf and V, and not less than 50% Fe, a volume size factor of Cr of said austenitic steel relative to an average atomic volume of a matrix phase thereof being 0.900–1.030.

7. A nuclear reactor according to claim 5, wherein said at least one of said structural members made of said austenitic steel is said shroud.

8. A nuclear reactor according to claim 6, wherein said at least one of said structural members made of said austenitic steel is said shroud.

9. A structural member according to claim 1, said structural member being a shroud.

10. The structural member according to claim 1, wherein the at least one kind selected from the group consisting of Pt and Pd is in solid solution in said austenitic steel.

11. The structural member according to claim 1, wherein the at least one kind is selected from the group consisting of 5–12% Pt and 5–12% Pd.

12. The structural member according to claim 1, wherein the at least one kind is selected from the group consisting of 7–10% Pt and 7–10% Pd.

13. The structural member according to claim 1, wherein the Mn and the at least one kind are correlated to each other, a combination of Mn content and content of the at least one kind being selected from the group consisting of (1) Mn content of 3–12% and at least one kind content of 4–12%; (2) Mn content of 3–7% and at least one kind content of 8–12%; and (3) Mn content of 8–12% and at least one kind content of 3–7%.

14. The structural member according to claim 1, wherein Cr is included in an amount of 17–20.6%.

15. The structural member according to claim 1, wherein the at least one kind is selected from the group consisting of 2.2–14.5% Pt and 2.2–14.8% Pd.

16. Austenitic steel according to claim 2, wherein the at least one kind is selected from the group consisting of 2.2–14.5% Pt and 2.2–14.8% Pd.

17. Austenitic steel according to claim 3, wherein the at least one kind is selected from the group consisting of 2.2–14.5% Pt and 2.2–14.8% Pd.

18. A nuclear reactor according to claim 5, wherein the at least one kind is selected from the group consisting of 2.2–14.5% Pt and 2.20–14.8% Pd.

19. A nuclear reactor according to claim 6, wherein the at least one kind is selected from the group consisting of 2.2–14.5% Pt and 2.20–14.8% Pd.

20. A structural member having a superior resistance to neutron irradiation embrittlement, comprising a surface used in contact with water under neutron irradiation, at least said surface of said member being made of austenitic steel consisting essentially, by weight, of not more than 0.02% C, not more than 1% Si, not more than 0.02% P, not more than 0.02% N, 0.5–16% Mn, 9–22% Cr, 8–14% Ni, 0.5–3% Mo, at least one kind selected from the group consisting of 2.2–16% Pt and 2.2–16% Pd, and not less than 50% Fe, a volume size factor of Cr of said austenitic steel relative to an average atomic volume of a matrix phase thereof being 0.900–1.030.

21. The structural member according to claim 20, wherein the at least one kind is selected from the group consisting of 2.2–14.5% Pt and 2.2–14.8% Pd.

22. A structural member having a superior resistance to neutron irradiation embrittlement, comprising a surface used in contact with water under neutron irradiation, at least said surface of said member being made of austenitic steel consisting essentially, by weight, of not more than 0.02% C, not more than 1% Si, not more than 0.02% P, not more than 0.02% N, 0.5–16% Mn, 9–22% Cr, 8–14% Ni, 0.5–3% Mo, at least one material selected from the group consisting of 2.2–16% Pt and 2.2–16% Pd, not more than 1% of at least one material selected from the group consisting of Nb, Ti, Zr, Ta, Hf and V, and not less than 50% Fe, a volume size factor of Cr of said austenitic steel relative to an average atomic volume of a matrix phase thereof being 0.900–1.030.

23. The structural member according to claim 22, wherein Cr is included in an amount of 17–20.6%.

* * * * *